United States Patent [19]

Puri et al.

[11] Patent Number: 5,253,056
[45] Date of Patent: Oct. 12, 1993

[54] SPATIAL/FREQUENCY HYBRID VIDEO CODING FACILITATING THE DERIVATIVES OF VARIABLE-RESOLUTION IMAGES

[75] Inventors: Atul Puri, Riverdale, N.Y.; Andria H. Wong, Morristown, N.J.

[73] Assignee: AT&T Bell Laboratories, Murray Hill, N.J.

[21] Appl. No.: 908,135

[22] Filed: Jul. 2, 1992

[51] Int. Cl.⁵ ...................... H04N 7/133; H04N 7/137
[52] U.S. Cl. ..................................... 358/133; 358/135; 358/136
[58] Field of Search ........................ 358/133, 135, 136

[56] References Cited
U.S. PATENT DOCUMENTS 5,001,561 3/1991 Haskell ................................ 358/133

OTHER PUBLICATIONS

International Standards Organization Committee Draft 11172-2, "Coding of Moving Pictures and Associated Audio for Digital Storage Media at up to about 1.5 Mbit/s," Nov. 1991.
"Video Coding Using the MPEG-1 Compression Standard," A. Puri, Proceedings of the Society for Information Display 92, May 1992, Boston.

Primary Examiner—Howard W. Britton
Attorney, Agent, or Firm—Robert P. Marley

[57] ABSTRACT

An adaptive technique for video encoding and decoding which facilitates the transmission, reception, storage, or retrieval of a scalable video signal. The technique allows this scaling to be performed in both the spatial and frequency domains. In a specific embodiment, video encoding is adaptively performed based upon a selection from among a multiplicity of compatible spatial-domain predictions from previously decoded images, and a selection of compatible predictions obtained from up-sampling decoded lower resolution images. The decoded lower resolution images correspond to a current temporal reference, and at least one of these lower resolution images is encoded in more than one frequency domain scales. In yet another embodiment, one lower resolution signal is encoded (without reference to any other low resolution signal) by employing the MPEG-1 standard, with a modified partitioning of the resultant bitstream into two or more frequency scale bitstreams. The decoded images from these bitstreams are employed in the spatial prediction of a higher resolution layers.

52 Claims, 19 Drawing Sheets

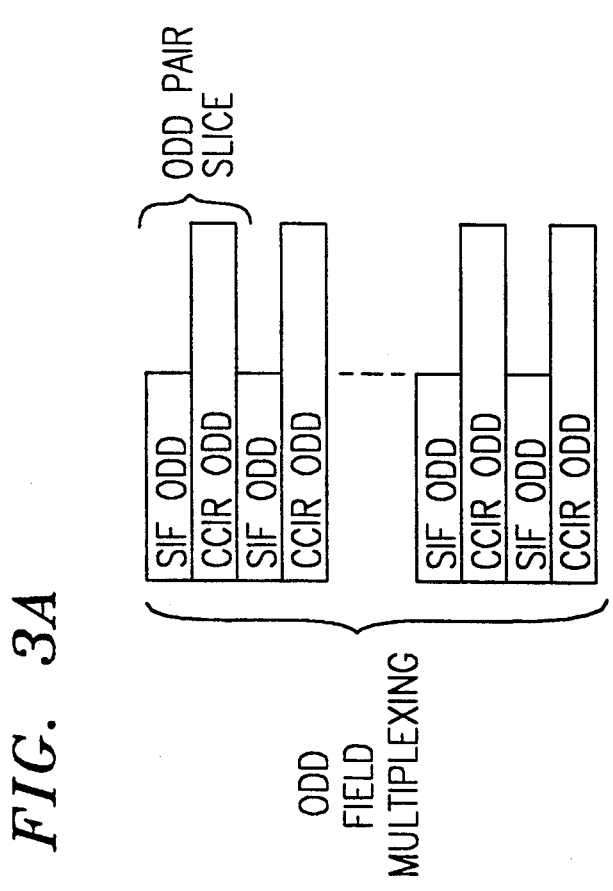
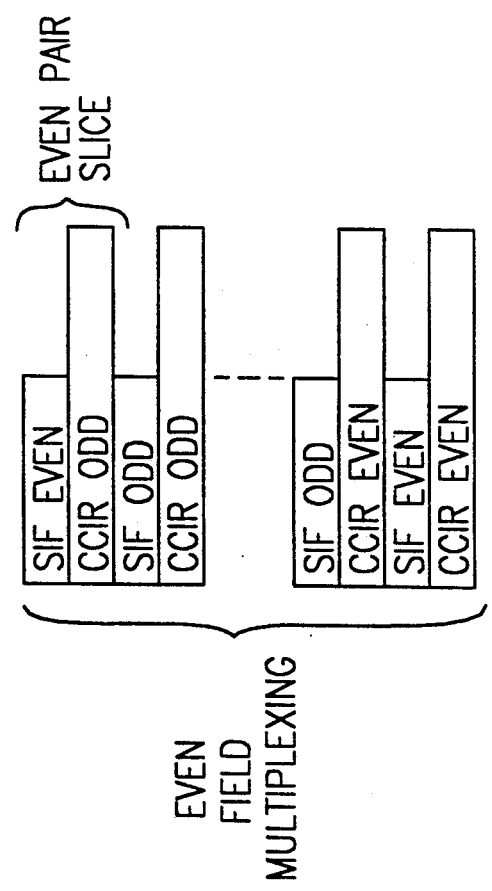
FIG. 3A
FIG. 3B

FIG. 6B

| ANALYZER TYPE | REFERENCE | INPUT 1 | INPUT 2 | OUTPUT | BYPASS CONTROL |
|---|---|---|---|---|---|
| INTER/INTRA | ORIGINAL VIDEO INPUT SIGNAL | INTER PREDICTION | BLOCK AVERAGE | INTER/INTRA INDICATOR SIGNAL (INTER/INTRA) | DIS_INTER SIGNAL |
| DUAL/SINGLE FIELD MOTION COMPENSATED PREDICTION | ORIGINAL VIDEO INPUT SIGNAL | DUAL FIELD PREDICTION | SINGLE FIELD PREDICTION | DUAL/SINGLE FIELD MOTION COMPENSATION SIGNAL (DUAL/SINGLE_FIELD_MC) | DIS_DUAL SIGNAL |
| FIELD/FRAME MOTION COMPENSATED PREDICTION | ORIGINAL VIDEO INPUT SIGNAL | FIELD PREDICTION | FRAME PREDICTION | FIELD/FRAME MOTION COMPENSATION SIGNAL (FIELD/FRAME_MC) | DIS_FIELD_MC SIGNAL |
| SPATIAL/TEMPORAL PREDICTION | ORIGINAL VIDEO INPUT SIGNAL | SPATIAL PREDICTION | TEMPORAL PREDICTION | COMPATIBILITY SIGNAL (S_T_COMP) | DIS_SPATIAL SIGNAL |

SPATIAL/FREQUENCY HYBRID VIDEO CODING FACILITATING THE DERIVATIVES OF VARIABLE-RESOLUTION IMAGES

TECHNICAL FIELD

The invention relates to the encoding and decoding of video signals, and more particularly, encoding a video signal in a manner which permits images having a wide range of resolutions to be decoded from a the encoded signal.

BACKGROUND OF THE INVENTION

Worldwide efforts are underway to improve the quality of video signal production, transmission, and reproduction because a great deal of commercial importance is being predicted for improved quality video systems. These efforts involve, at least in part, increasing the resolution with which images are converted into representative electrical signals by increasing the spatial and temporal sampling rates that are used to convert video images into electrical signals. This increase in resolution consequently means that more data about images must be produced, processed, and transmitted in a given interval.

Video images such as those images in the field of view of a television camera are scanned at a predetermined rate and converted into a series of electrical signals, each electrical signal representing a characteristic of a predetermined region of the image generally referred to as a picture element ("pel"), or pixel. A plurality of pels taken together at a predetermined instant of time form what amounts to a still picture (i.e., frame) representing the nature of the image at the predetermined instant of time. Increasing the quality of video signals produced in this manner involves, at least in part, the use of a larger number of smaller-size pels to represent a given image frame and the production of a large number of images per unit of time.

As the number of pels for each video frame and the rate at which frames are produced increases, there is an increasing amount of video data which must be produced, transmitted, and received in a given interval. A number of data compression schemes have been proposed which attempt to transmit higher quality video images using the same numbers of bits and the same bit rates used for lower quality images. The Motion Picture Experts Group Phase 1 ("MPEG-1") standard provides a particular syntax and decoding process for one such scheme. This standard is set forth in International Standards Organization ("ISO") Committee Draft 11172-2, "Coding of Moving Pictures and Associated Audio for Digital Storage Media at up to about 1.5 Mbit/s", November 1991.

It may be desirable to obtain one or more lower resolution images from a single transmitted high-resolution video signal. For example, a video signal simultaneously transmitted to both high-definition television ("HDTV") and standard television receivers may have to provide images having a very high degree of resolution to the HDTV receivers, and images having a lesser degree of resolution to the standard receivers. Similarly, the degree of image resolution which need be obtained from a video signal displayed on a windowed computer screen must be varied with the size of a particular window in which it is displayed.

One known method of providing a video signal from which images of varying resolution may be derived is to simultaneously transmit a set of independent replicas of a video sequence; each replica being scaled for reproduction at a different level of resolution. This approach, referred to as "simulcasting", is simple, but requires an increased bandwidth to accommodate the transmission of multiple independent video images. A more bandwidth efficient alternative to simulcasting, is scalable video. Scalable video is a technique wherein a video signal is encoded and the resulting bit-sequence is partitioned so that a range of resolution levels may be derived from it depending upon the particular signal decoding scheme employed at a receiver.

Unfortunately, the encoding and decoding of scalable video is not provided for within the constraints of most video standards. A particular limitation of the MPEG-1 standard coding is its lack of provisions facilitating scalable video encoding and decoding.

SUMMARY OF THE INVENTION

The aforementioned problems are solved, in accordance with the principles of the invention, by employing a unique, adaptive video encoding and decoding technique which facilitates the transmission, reception, storage, or retrieval of a scalable video signal. The invention allows this scaling to be performed in both the spatial and frequency domains. In a specific embodiment of the invention the adaptive encoding of a video signal is realized based upon a selection from among a multiplicity of predictions from previously decoded images, and a selection of compatible spatial domain predictions obtained from up-sampling decoded lower resolution images. The decoded lower resolution images correspond to a current temporal reference, and at least one of these lower resolution images is encoded in more than one frequency domain scales.

In yet another embodiment of the invention, one lower resolution signal is encoded (without reference to any other low resolution signal) by employing the MPEG-1 standard, with a modified partitioning of the resultant bitstream into two or more frequency scale bitstreams. The decoded images from these bitstreams are employed in the spatial prediction of a higher resolution layers.

BRIEF DESCRIPTION OF THE DRAWING

In the drawing:

FIG. 3A is a pictorial representation of the video data slice structure input to the digital video encoding system illustrated in FIG. 1;

FIG. 3B is a pictorial representation of the bitstream slice structure output as a result of the encoding performed in accordance with the example of the invention illustrated in FIG. 1;

FIG. 6B is a table showing the reference, input, bypass control, and output signals for the analyzer of FIG. 6A;

DETAILED DESCRIPTION

Figure 1:
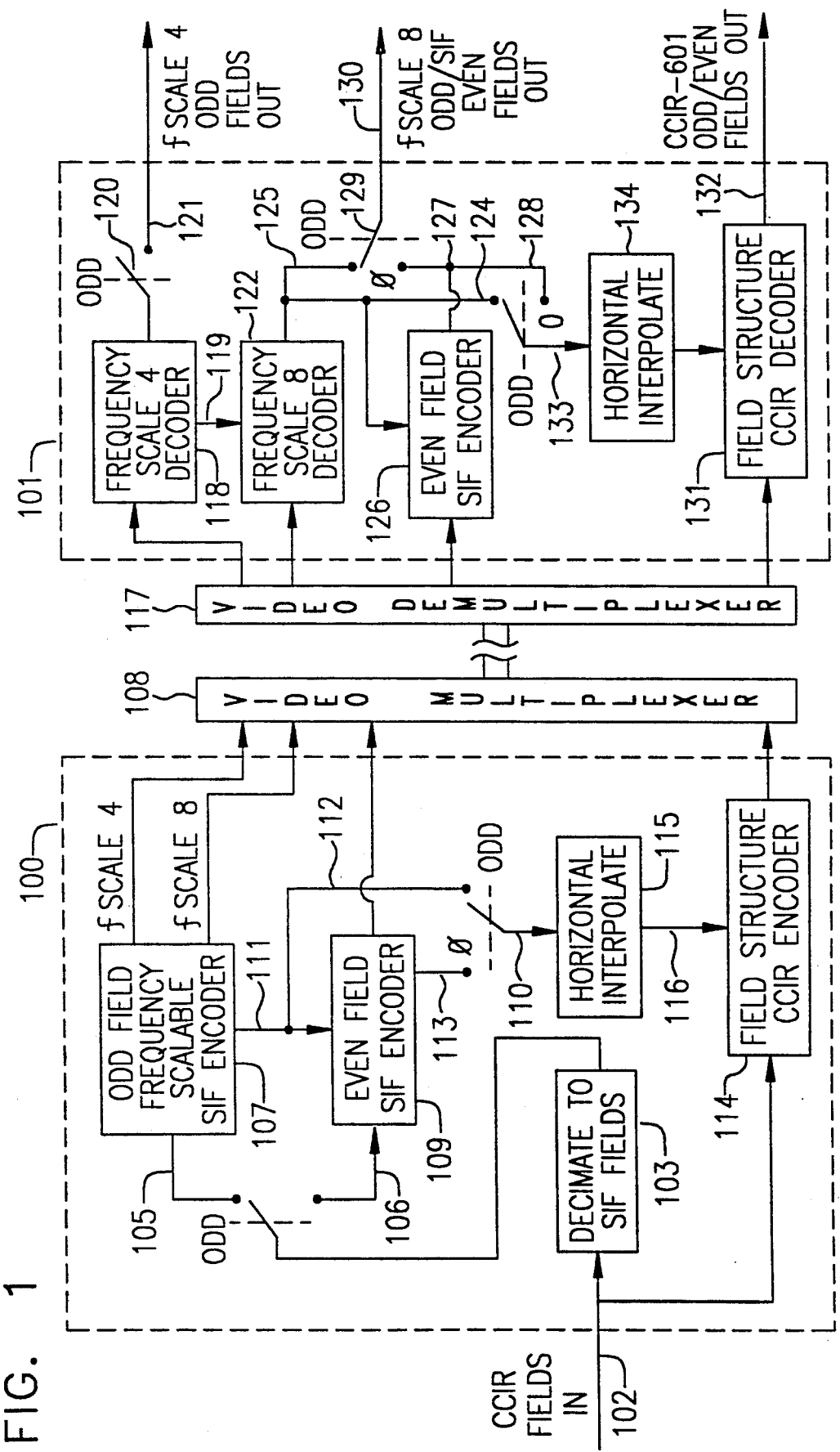
FIG. 1 shows, in simplified block diagram form, an illustration of a video encoding/decoding system which facilitates the three-layer spatial/frequency-scalable, and the two-layer spatially scalable encoding and decoding of a digital video signal in accordance with one example of this invention.

FIG. 1 is a simplified block diagram showing an illustration of a video signal encoding/decoding system, in accordance with one example of this invention, which facilitates the encoding and decoding of fields of digital video signal having three layers of spatial resolution for odd fields, and two layers of spatial resolution for even fields. Signal encoding is performed within functional block 100, and signal decoding is performed within functional block 101. Layer 1 consists of a bitstream corresponding to SIF odd fields encoded with f-scale 4 frequency scaling. For odd fields, layer 2 consists of a bitstream corresponding to SIF odd fields encoded with f-scale 8 frequency scaling. For even fields, only layer 2 and 3 are encoded. Layer 2 for even fields consists of SIF even fields encoded using adaptive dual/single field motion compensated predictions. Layer 3 consists of CCIR-601 field-structured pictures which are encoded using an adaptive choice of temporal prediction from previous coded pictures, and a spatial prediction corresponding to a current temporal reference obtained by interpolating either an f-scale 8 odd field (if the CCIR-601 field being encoded is odd), or an SIF even field (if the CCIR-601 field being encoded is even). As in the encoding of layer 2, layer 3 is encoded using adaptive dual/single field motion compensated predictions (the spatially interpolated layer 2 images—f-scale 8 odd images for odd fields, and SIF even images may for even fields—may be used as spatial prediction for CCIR-601 fields of corresponding parity).

As shown in FIG. 1, CCIR-601 digital video signals are input to functional block 100 via line 102. The digital video input signals are spatial and temporal samples of a video image and may be produced by scanning an image field and producing an electrical signal relating to the characteristics of the image field at predetermined points. The characteristics determined in the scanning operation are converted into electrical signals and digitized. The video input signals comprise a succession of digital words, each representing some information at a particular instant of time for a small region of the image field generally referred to as a pel. A complete set of digital representations for the image at a particular instant of time is called a frame. Each frame may be considered to be composed of two interlaced fields representing odd-and even-numbered horizontal lines in the image.

The digital video signal encoded and decoded by this invention may be a monochrome video signal or a color video signal. In the case of a monochrome video signal, each frame may comprise a set of digital representations of the brightness or intensity of a two-dimensional array of pels which make up a video image. In the case of a color video signal, each picture comprises not only a brightness component but also a color component. For example, in the CCIR-601 4:2:2 recommendation, color video signal picture (i.e., a temporal sample of the image) may be composed of a luminance frame, Y, of 720 horizontal pels×480 lines and two chrominance frames, Cb and Cr, at ½ resolution of 360 horizontal pels×480 lines each. A sequence of such pictures may be transmitted at a rate of 29.97 pictures per second. The luminance or chrominance frame is formed as the interlaced union of the two constituent CCIR-601 fields, while CCIR-601 4:2:0 frames can be derived by filtering and subsampling the respective 4:2:2 CCIR-601 chrominance frames. 4:2:2 is a standard sampling structure for CCIR-601 video having a 4 to 2 to 2 sampling ratio of Y, Cb, and Cr, respectively. For the purpose of illustrating a specific example of the invention, the description below assumes that the digital video signal received via line 102 is a video signal in accordance with the CCIR-601 4:2:0 resolution. Those skilled in the art will appreciate that the principles of the invention are applicable to other types of video signals, such as HDTV video signals.

To assist in the description of the example of the invention shown in FIG. 1, some terminology should be defined. A typical block is an 8-horizontal-row by 8-vertical-column array of contiguous pels. Blocks may be groups of luminance data or groups of chrominance data. A typical macroblock is composed of four contiguous 8×8 luminance data blocks and the two 8×8 chrominance data blocks corresponding to the area of the image represented by the four luminance data blocks. A slice is one horizontal row of macroblocks starting at the left edge of the picture and ending at the right edge of the picture. A luminance frame is formed as an interlaced union of two CCIR-601 luminance fields. One field is comprised of even-numbered horizontal rows of pels, and the other field is comprised of odd-numbered horizontal rows of pels.

In the example of the invention shown in FIG. 1, a plurality of picture types are encoded and decoded. Specifically, I-pictures, P-pictures, and B-pictures are encoded and decoded. I-pictures or intra-coded pictures are pictures which are encoded and decoded without reference to any other pictures (i.e., no temporal prediction is required). P-pictures, or predicted pictures are encoded in light of a previous pictures (namely in light of a temporal prediction from previously decoded I- or P-pictures). Motion compensation may be used to produce P-pictures. B-pictures, or bidirectionally predicted pictures are pictures which are encoded in light of characteristics of previously decoded I- or P-pictures and future decoded P- or I-pictures. As in the case of P-pictures, B-pictures may also be encoded by using motion compensation. In appropriate circumstances, P-pictures and B-pictures may have some of their blocks encoded in the same fashion that the blocks of the I-pictures are encoded, i.e., without reference to other pictures ("intra coding").

Figure 2A:
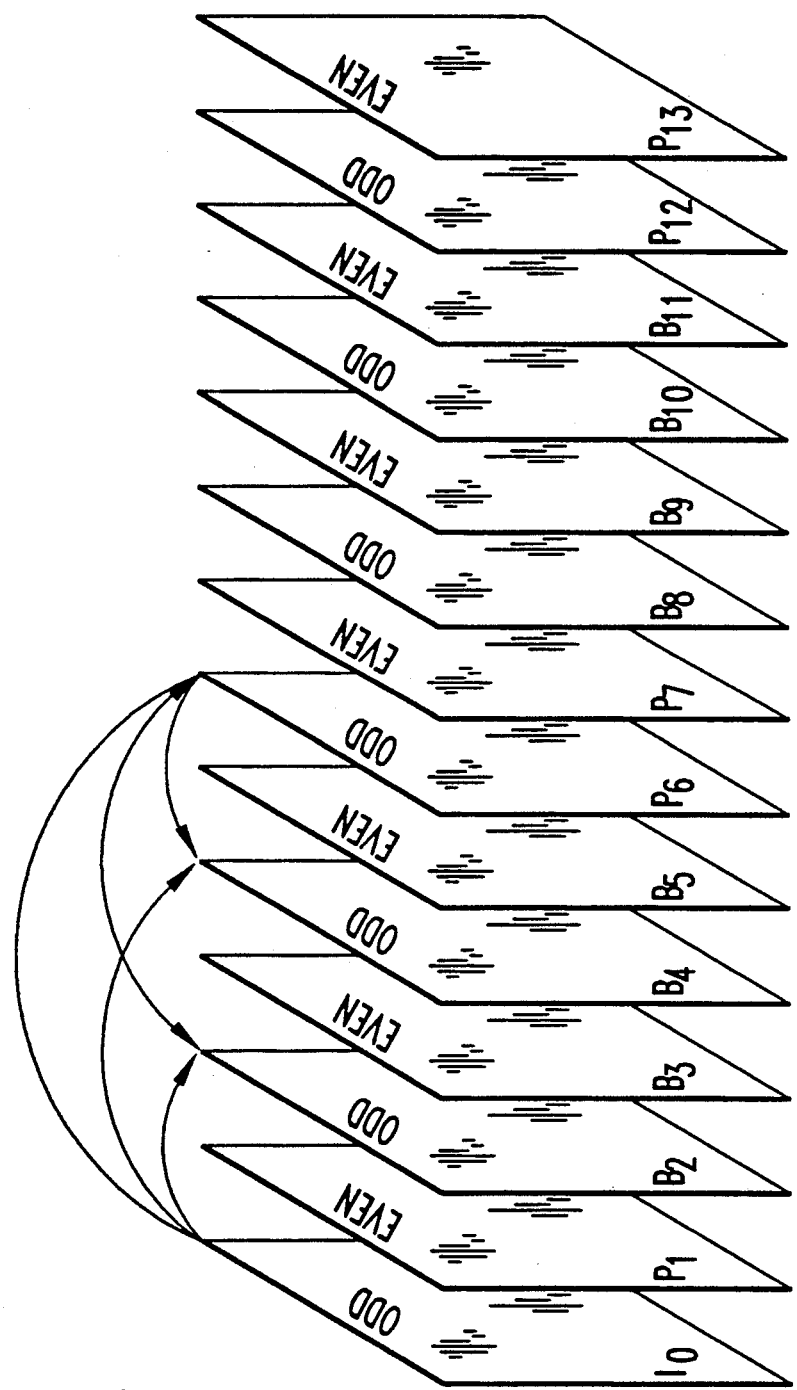
FIG. 2A is an illustration of a group-of-pictures structure showing MPEG-1 type predictions which may be effected for odd field macroblocks.

A Group-of-Pictures (GOP) structure illustrating MPEG-1 type prediction options for macroblocks of odd fields only is shown in FIG. 2A. The even fields are drawn for completeness and are not used for prediction. An I-picture (I0) field does not require temporal prediction. P-picture fields require temporal prediction from the previously decoded I- or P-picture fields. In this example P6 is predicted from I0. B-pictures are bidirectionally predicted from the previous I- or P-picture fields and the next P- or I- picture field. Both B2 and B4 are bidirectionally predicted from I0 and P6. In the coding/decoding systems to be described, MPEG-1 prediction is applied on the SIF odd field macroblocks.

Figure 2B:
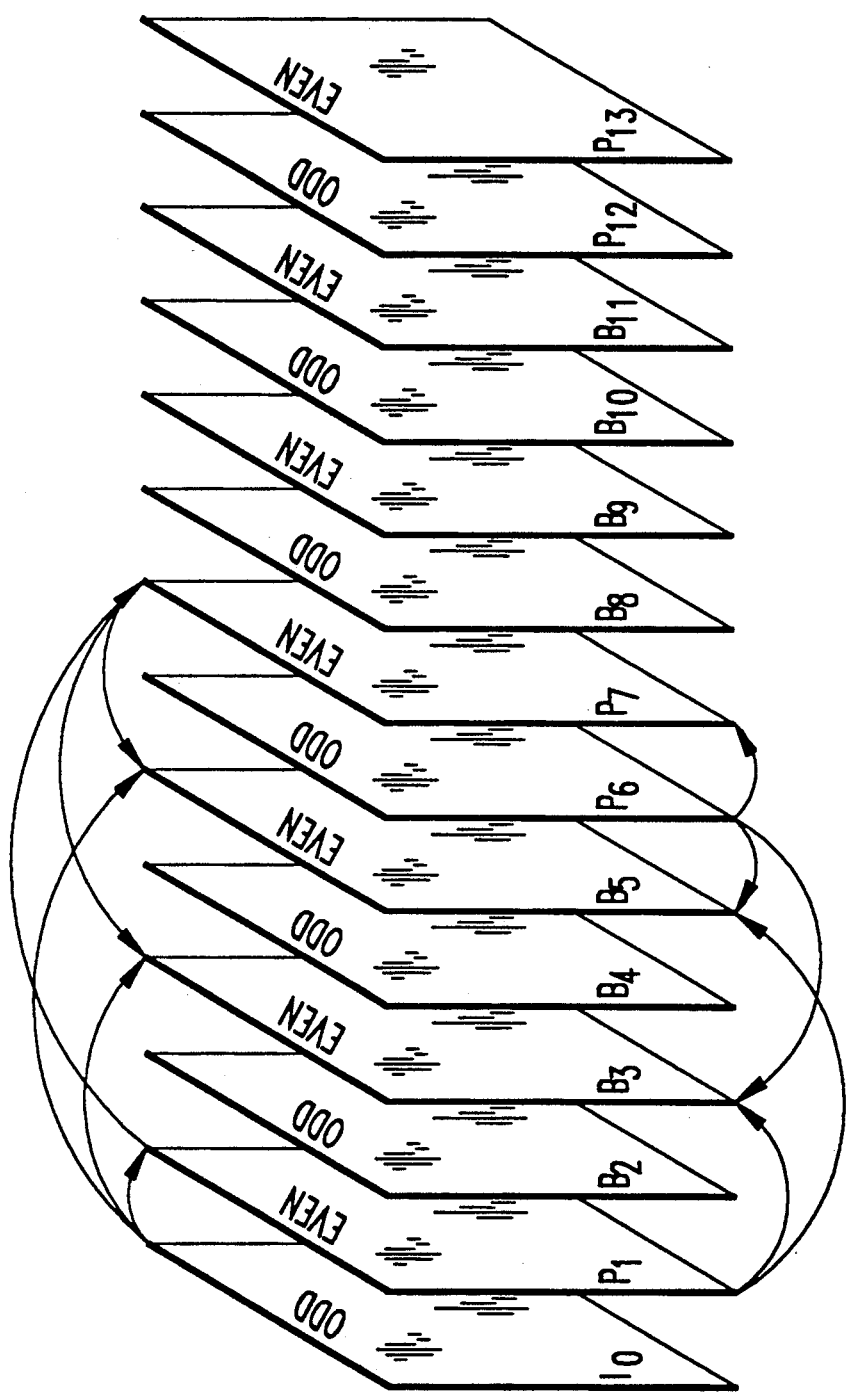
FIG. 2B in an illustration of a group-of-pictures structure showing single-field predictions which may be effected for even-field macroblocks in accordance with one example of this invention.

FIG. 2B shows a GOP structure of single field prediction options for macroblocks of even fields. P-picture macroblocks are predicted from either the immediate previously decoded odd field, or the immediate previously decoded even field, which belong to coded I- or P-picture fields (whichever gives a better prediction). In this example, macroblocks of P1 are predicted from I0 only, as I0 is the only field available for prediction. P7 is predicted from either P1 or P6 on a macroblock basis, whichever gives a better estimate. B-picture macroblocks are predicted bidirectionally from decoded I- or P-fields. In this example, macroblocks of B3 reference either I0 or P1 for forward prediction, and reference either P6 or P7 for backward prediction.

Figure 2C:
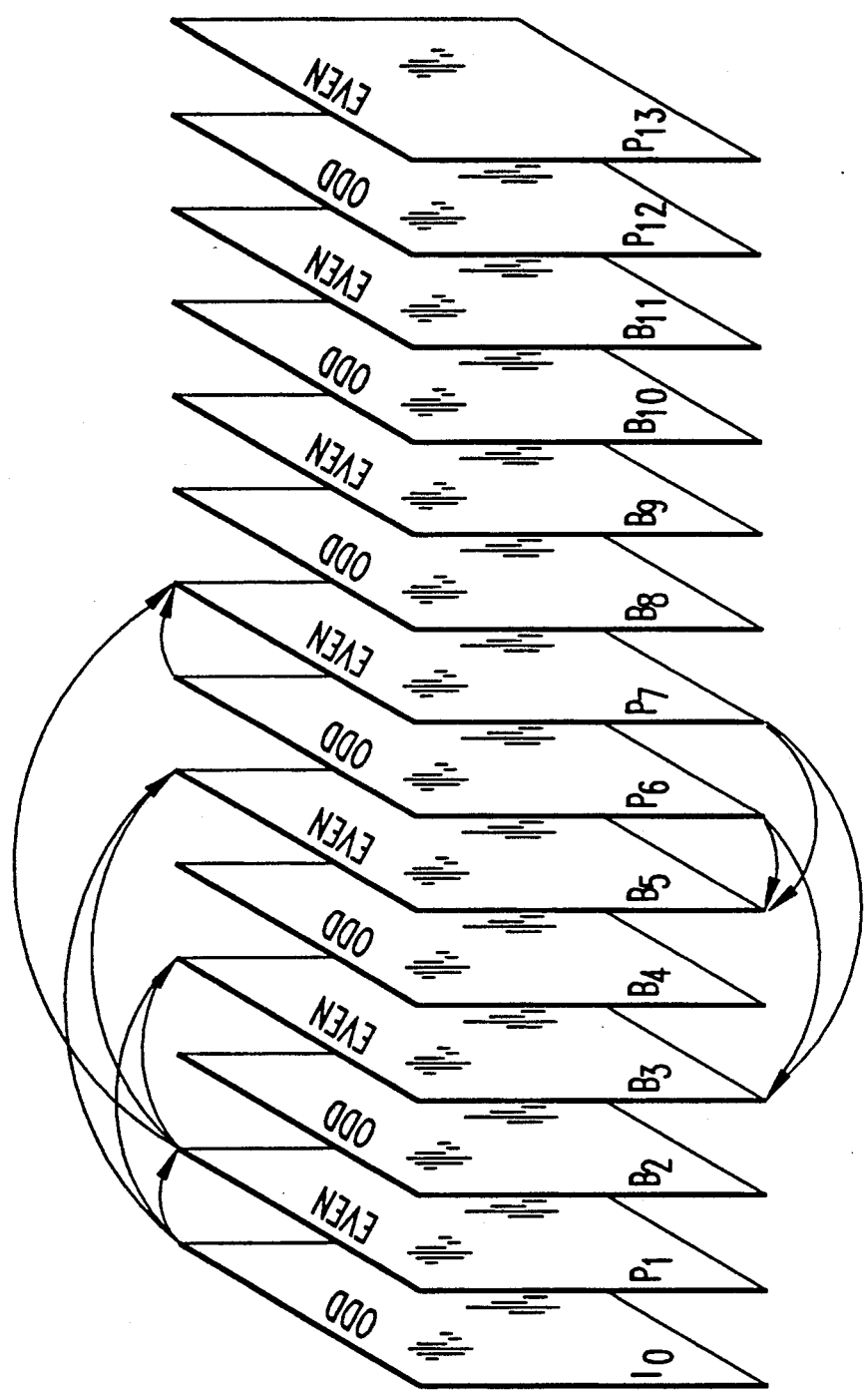
FIG. 2C in an illustration of a group-of-pictures structure showing dual-field predictions which may be effected for even-field macroblocks in accordance with one example of this invention.

The GOP structure of FIG. 2C shows dual field prediction options for macroblocks of even fields. P-picture macroblocks reference both the immediate previously decoded odd and even fields. The prediction used is the average of the predictions obtained from both of these referenced fields. In this example, P7 macroblocks reference both P1 and P6, and use the average of the predictions made from these referenced fields. B-picture macroblocks are predicted either in the forward direction or in the backward direction, but not both. They reference either the immediate previously decoded odd and even fields, of the immediate future decoded odd and even fields, which belong to coded I- or P-picture fields. Regardless of the direction, the prediction is the average of best prediction macroblocks of the two referenced fields.

As shown in FIG. 1, the CCIR-601 digital video fields received on line 102 are decimated to SIF fields by SIF decimator 103 for the encoding of layers 1 and 2. Such decimators are well-known in the art. The decimated video is output by decimator 103 to switch 104, which directs SIF decimated odd fields to line 105, and SIF decimated even fields to line 106. The SIF odd fields are directed to odd field frequency scalable SIF encoder ("SIF frequency encoder") 107, where they are f-scale 4 encoded, and f-scale 8 encoded. In the simplest case this SIF frequency encoder can be an MPEG-1 encoder modified to perform frequency scaling. The bitstream corresponding to each of these f-scale encoded fields is then sent to video multiplexer 108 (the encoded f-scale 4 bitstream corresponds to the first video layer, the encoded f-scale 8 bitstream corresponds to the second video layer). SIF frequency encoder 107 also outputs a decoded SIF odd signal to even field SIF encoder 109 and switch 110 via lines 111 and 112, respectively. Even field SIF encoder 109 encodes the SIF even fields into a bitstream (corresponding to the second video layer) which is output to video multiplexer 108. Even field SIF encoder 109 also outputs a decoded SIF even signal to switch 110 via line 113. Field-structure CCIR-601 encoder 114 encodes the CCIR-601 fields of the digital video signal received via line 102, with an adaptive selection between temporal and spatial picture predictions. Switch 110 allows either a decoded odd field, or a decoded even field to be input to horizontal interpolator 115 (a decoded odd field is selected if an odd CCIR-601 field is being encoded, and a decoded even field is selected if an even CCIR-601 field is being encoded). The selected decoded field is upsampled by horizontal interpolator 115 to CCIR-601 field resolution, and output via line 116 to field-structure CCIR-601 encoder 114, where it is used for obtaining a spatial prediction of the third video layer. The resulting encoded bitstream (corresponding to the third video layer) is output by field-structure CCIR-601 encoder 114 to video multiplexer 108.

Video multiplexer 108 multiplexes the encoded bitstreams into a single bitstream. This single bitstream is transmitted to video demultiplexer 117 where it is demultiplexed into individual bitstreams. When decoding odd fields, frequency scale 4 SIF odd decoder ("f-scale 4 decoder") 118 decodes the bitstream corresponding to the f-scale 4 encoded odd field of the first video layer, thereby reconstructing an f-scale 4 SIF odd field video signal which is output to line 119 and switch 120. Switch 120 closes when an odd field is being decoded to allow the output of f-scale 4 decoder 118 to reach output line 121. Frequency scale 8 SIF odd decoder ("f-scale 8 decoder") 122 decodes the second video layer bitstream corresponding to the f-scale 8 encoded odd field (in light of the partially decoded f-scale 4 data) and reconstructs an f-scale 8 SIF odd field video signal which is output on lines 123, 124, and 125. Even field SIF decoder 126 decodes the bitstream corresponding to the encoded SIF even field (employing an optional prediction based upon the SIF odd fields decoded by f-scale 8 decoder 122). This yields an SIF even field video signal which is output on lines 127 and 128. Depending upon whether an even or an odd field is being decoded, switch 129 selects either the f-scale 8 odd field on line 125, or the SIF even field on line 127 for output on line 130. When an even field is being decoded, switch 120 is opened, as there are no f-scale 4 even fields. Field-structured CCIR-601 decoder 131 decodes the bitstream corresponding to the third video layer (employing an optional spatial prediction based upon the interpolated decoded SIF odd or even fields from layer two) to reconstruct a CCIR-601 video signal which is output on line 132. Switch 133 allows either a decoded odd f-scale 8 field, or a decoded even field to be input to horizontal interpolator 134 (an odd field is selected if an odd CCIR-601 field is being decoded, and an even field is selected if an even CCIR-601 field is being decoded). The selected field is upsampled by horizontal interpolator 134 to CCIR-601 resolution, and output to field-structure CCIR-601 decoder 131, where it is used for obtaining a spatial prediction of the third video layer. A representation of the slice structure employed in the encoding performed within functional block 100 of FIG. 1 is shown in FIG. 3A. The slice multiplexing of the input picture starts with an odd field, followed by an even field. Within each field, both slices of any given SIF/CCIR-601 slice pair correspond to the same strip of picture. The slice of the lower resolution layer is multiplexed before the slice of the higher resolution layer. All slices consist of one or more macroblocks, which in turn consist of blocks of pixels. FIG. 3B shows the slice multiplexing structure of the bitstream output as a result of the encoding performed within functional block 100. This multiplexing structure is basically identical to that of FIG. 3A, except that each SIF odd input slice produces f-scale 4 and f-scale 8 bitstream slices. This results in a trio of slices for each odd fields: f-scale 4, f-scale 8, and CCIR-601. The slices of different layers are also multiplexed to facilitate easy decoding. The slices are arranged so that all the information from lower resolution layers needed to decode a higher resolution layer is made available prior to the initiation of high resolution layer decoding. Therefore, compressed slices of lower layers are multiplexed first. In FIG. 3B the f-scale 4 slice is presented first, followed by the f-scale 8 slice, and then by the CCIR-601 odd slice. The pattern of f-scale 4, f-scale 8, and CCIR-601 odd slices repeats until the odd field is finished. The even field slices are multiplexed with an SIF even slice, followed by a CCIR-601 even slice. Note that the even field encoder output (FIG. 3B) has no frequency scales.

Figure 4A:
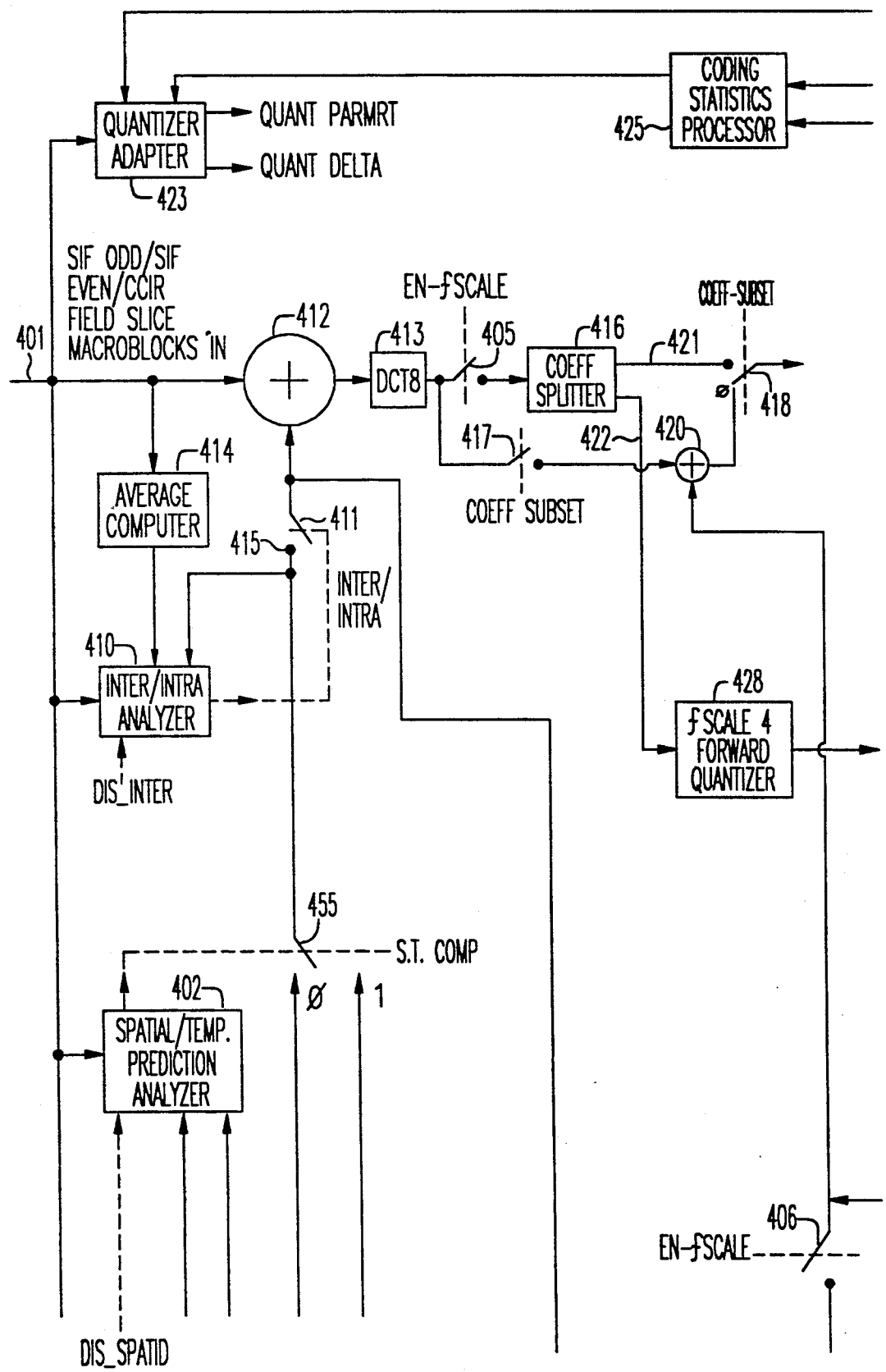
FIG. 4A-C show, in simplified block diagram form, the internal architecture of a picture encoder which facilitates the encoding in accordance with the example of the invention illustrated in FIG. 1.
Figure 4B:
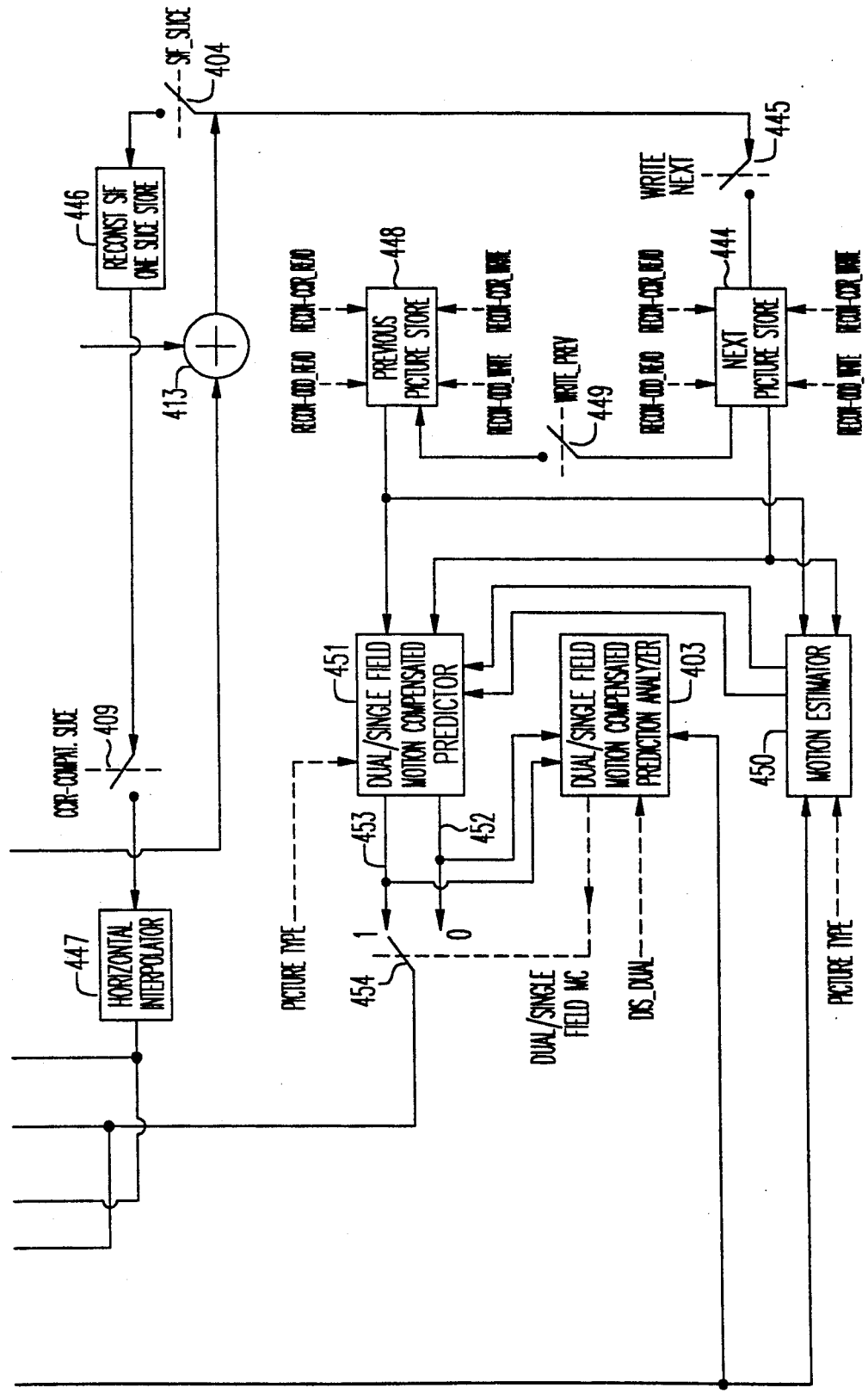
Figure 4C:
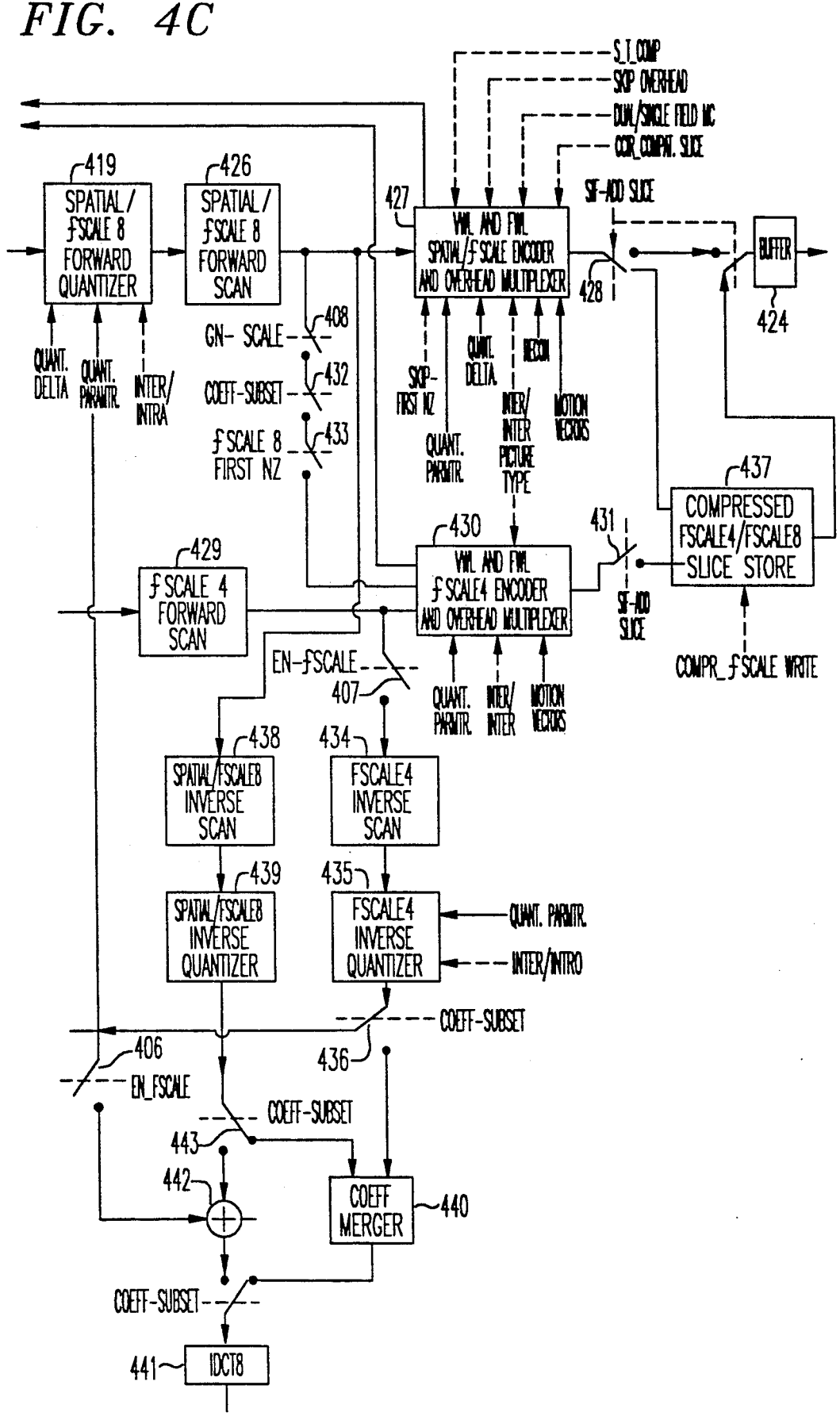
Figure 5:
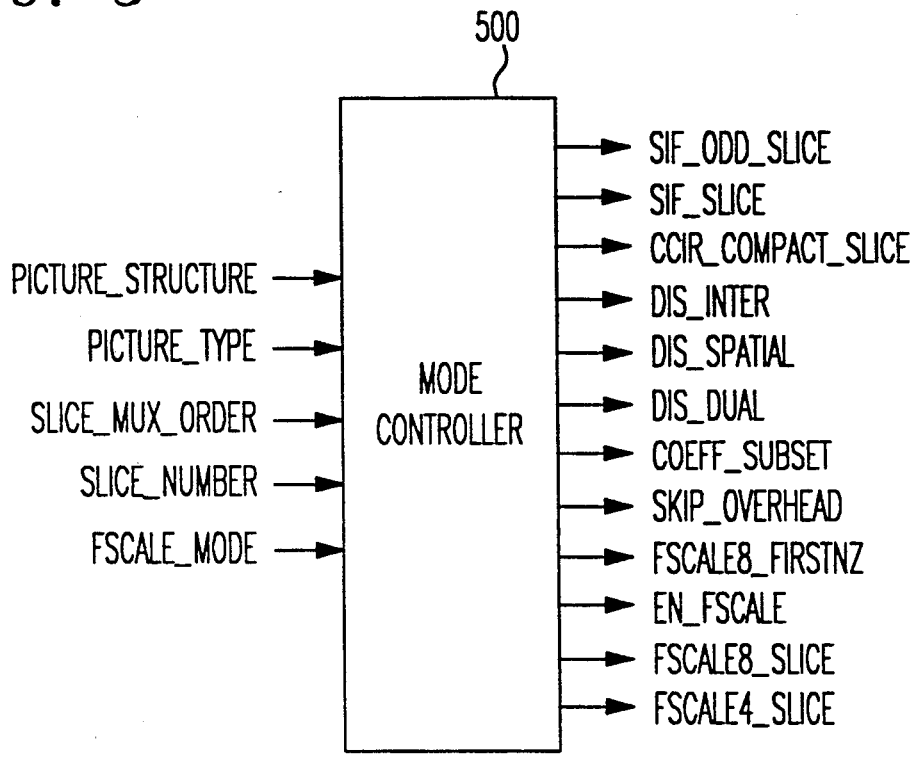
FIG. 5 shows, in simplified block diagram form, a mode controller for the encoder of FIG. 4A-C.

Although FIG. 1 shows three separate encoders being employed to accomplish the encoding of the various video layers, in a particular embodiment of the invention, the encoding for all three layers may be accomplished within a single adaptive encoder. FIG. 4A-C show a simplified block diagram of the internal architecture of one example of such an adaptive picture encoder. As this encoder must perform distinctly different types of encoding, certain analyzers and subsystems within it must be enabled and disabled as a function of the particular type of encoding being performed at a given time. This enabling/disabling is performed as function of control signals generated by a mode controller. Mode controller 500, shown in FIG. 5 generates the signals to control the mode of operation for the encoder of FIG. 4A-C. Mode controller 500 receives input signals from an independently running processor (not shown in FIG. 5) which generates the input signals to cause a particular slice arrangement to be realized according to preprogrammed information and the type of picture being processed. The input signals provided to mode controller 500 include: picture_structure, which identifies whether a picture is frame-structured or field-structured; picture _type, which identifies an I-, P-, or B-picture; slice_mux_order, which identifies the slice multiplexing structure employed; slice_number, which provides a count of the slice being processed; and fscale_modes, which identifies the mode of frequency scaling to be employed (f-scale 4 or f-scale 8). The output of mode controller 500 provides bi-level ("0" or "1") control signals including: sif_slice ("1" when the current slice is from an SIF field); sif_even_slice ("1" when the current slice is from an SIF even field); sif_odd_slice ("1" when the current slice is from an SIF odd field); ccir_compat_slice ("1" when current slice is of CCIR-601 resolution and uses a compatible prediction); fscale8_firstnz ("1" when the first non-zero coefficient of a frequency scale-8 layer becomes available); en_fscale ("1" when frequency scaling is to be enabled); fscale8_slice ("1" when the current slice is f-scale 8 resolution); fscale4_slice ("1" when the current slice is f-scale 4 resolution); coeff_subset ("1" if different frequency layers contain disjoint sets of frequency coefficients; skip_overhead, ("1" if overhead such as motion-vectors, and inter/intra do not need to be multiplexed in the bitstream); and bypass control signals dis_inter, dis_spatial, and dis_dual (which correspond to the inter/intra, the spatial/temporal prediction, and the dual/single field prediction analyzers).

Figure 6A:
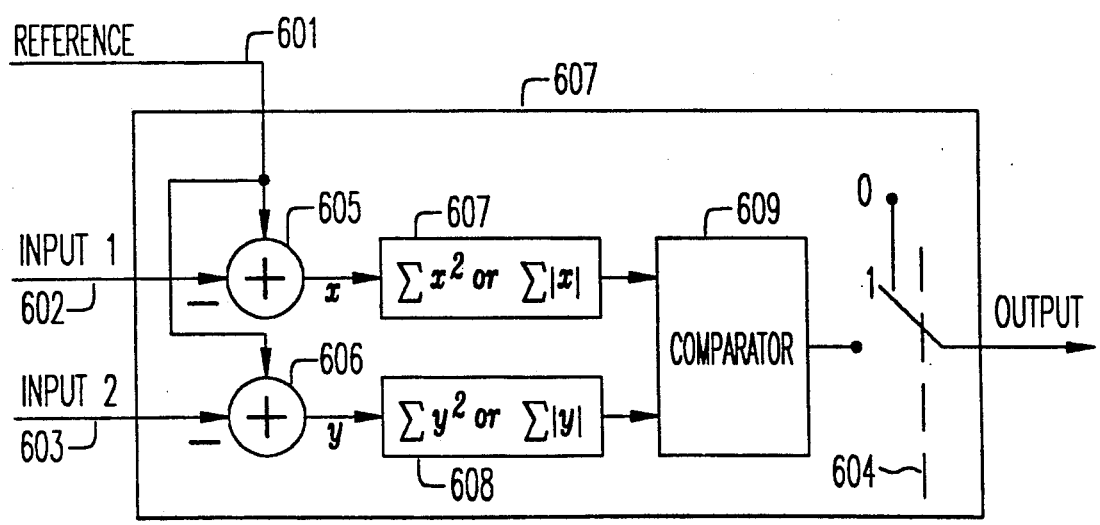
FIG. 6A shows, in simplified block diagram form, the basic architecture of an analyzer used within the picture encoder of FIG. 4A-C.

The inter/intra, spatial/temporal prediction, and dual/single field motion compensated prediction ("dual/single field MCP") analyzers employed within the encoder of FIG. 4A-C (as well as those analyzers employed within other encoders and decoders which will be discussed below) are all of the same basic configuration as analyzer 600 illustrated in FIG. 6A. Analyzer 600 accepts as input a reference signal on line 601, a first input signal ("Input 1") on line 602, a second input signal ("Input 2") on line 603, and a bypass signal on line 604. The reference signal is always the original video signal input to the particular encoder in which the analyzer is located. A signal indicative of the difference between the reference signal and the input 1 signal is output by differencing element 605. Similarly, a signal indicative of the difference between the reference signal and the Input 2 signal is output by differencing element 606. The energy in the signals output by differencing elements 605 and 606 is computed, respectively, by energy summing elements 607 and 608. This energy summation may be arrived at by any suitable method using either sum of squares or sum of absolute value criteria. The energy summations are then fed to comparator 609. If the input from summing element 607 is smaller or equal to the input from summing element 608, the output of comparator 609 is "1". If the input from summing element 607 is greater than the input from summing element 608, the output of comparator 609 is "0". However, if the bypass signal input on line 604 is set to "1", the comparator output is bypassed, and the output of analyzer 600 is forced to "0". FIG. 6B is a table showing the various reference, Input 1, Input 2, bypass control, and output signals for the various types of analyzers employed within the encoders discussed below.

The SIF odd fields (layer 1) are encoded in a manner very similar to MPEG-1 standard encoding. SIF odd field macroblocks output by SIF decimator 103 (FIG. 1) are received by the adaptive picture encoder of FIG. 4A-C via line 401. As frequency scaled encoding does not use spatial or dual field prediction, mode controller 500 sets both the dis_spatial and dis_dual signals to "1". This effectively disables spatial/temporal prediction analyzer 402, and dual/single field MCP analyzer 403, resulting in the compatibility signal ("s_t_comp") being set to "0", and the dual/single field motion compensation signal ("dual_single_field_mc") being set to "0". The sif_slice signal, and the en_fscale signal are set to "1", while the ccir_compat_slice signal is set to "0" by mode controller 500. Respectively, these signals cause switch 404 to close, switches 405, 406, 407, and 408 to close, and switch 409 to open.

If the current picture is an I-picture, mode controller 500 outputs a dis_inter bypass control signal of "1", thereby disabling inter/intra analyzer 410 so that it outputs a "0" inter/intra signal. This causes switch 411 to remain open so that differencer 412 receives a prediction signal of zero at its negative input. As a result, the input video signal on line 401 is passed, unaltered, through differencer 412 to f-scale 8 discrete cosine transform circuit ("DCT-8") 413. If the current picture is not an I-picture, inter/intra analyzer 410 is not disabled, but rather employed to calculate the inter-coding prediction error variance and intra-coding variance. As shown in FIG. 6B, intra-coding variance is calculated by computing the square difference between the original video signal (received on line 401 in FIG. 4A) and a signal representing the average energy of the original video signal (the average energy is computed by average computer 414 in FIG. 4A). Inter-coding prediction error variance is calculated by computing the square of the difference between the original video signal and an inter prediction signal received via line 415 (FIG. 4A). An inter/intra signal is generated so as to select whichever of these computed variances represents the smaller energy. The resulting inter/intra signal controls switch 411 and determines what differencer 412 will subtract from the video signal on line 401 before the signal is passed to DCT-8 413.

DCT-8 413 performs a discrete cosine transform upon each 8×8 block of the current macroblock. Coefficient splitter 416 splits the DCT-8 coefficients into two disjoint groups: one for f-scale 4 encoding, the other for potential use in f-scale 8 encoding. The coef_subset signal (generated by mode controller 500) determines whether the coefficients used for f-scale 8 encoding contain only a subset of coefficients which excludes the f-scale 4 coefficients (coeff_subset="1"), or contain the entire set of f-scale 8 coefficients, including the f-scale 4 coefficients (coeff_subset="0"). When coeff_subset="1", switch 417 is opened, and switch 418 is connected to line 421 so that a subset of coefficients (f-scale 4 coefficients are excluded) output by DCT-8 413 are passed to spatial/f-scale 8 forward quantizer ("f-scale 8 forward quantizer") 419. However, if coeff_subset="0", the coefficients from DCT-8 413 are also passed to differencer 420, where de-quantized f-scale 4 coefficients are used to predict an f-scale 4 subset of f-scale 8 coefficients.

The encoding of the coefficients from DCT-8 413 is performed as follows if coeff_subset="1". The coefficients are split into disjoint sets of f-scale 8 coefficients (line 421) and f-scale 4 coefficients (line 422) by coefficient splitter 416. The f-scale 8 coefficients are passed to f-scale 8 forward quantizer 419 which quantizes each coefficient based on whether the current macroblock is intra or inter coded, a quant_parmtr signal, and a quant_delta signal. The quantization parmtr signal (which controls the coarseness of the macroblock being encoded) is determined in light of the characteristics of the input signal communicated to quantizer adapter 423, the fullness of buffer 424, and in light of coding statistics compiled by coding statistics processor 425. The quant_delta signal is used to modify the quant_parmtr signal for f-scale 8 encoding. The quantized f-scale 8 coefficients are forward scanned by spatial/f-scale 8 forward scanner ("f-scale 8 forward scanner") 426 in a predetermined order and a run/level corresponding to every non-zero DCT coefficient is computed. This facilitates the encoding of the coefficients by variable/fixed word-length f-scale 8 encoder and overhead multiplexer ("V/FWL f-scale 8 encoder") 427. The skip_overhead signal, shown to be input to V/FWL f-scale 8 encoder 427 is a command signal used to suppress multiplexing of overhead information when coding f-scale 8, as this information can be derived from the f-scale 4 bitstream. The output of V/FWL f-scale 8 encoder 427 is passed to switch 428. The f-scale 4 coefficients output by coefficient splitter 416 are passed to f-scale 4 forward quantizer 428 which quantizes each coefficient based on whether the current macroblock is intra or inter coded, and the quant_parmtr signal. The quantized f-scale 4 coefficients are forward scanned by f-scale 4 forward scanner 429 in an predetermined order and a run/level corresponding to every non-zero DCT coefficient is computed. This facilitates the encoding of the coefficients by variable/fixed word-length f-scale 4 encoder and overhead multiplexer ("V/FWL f-scale 4 encoder") 430. V/FWL f-scale 4 encoder 430 also receives a run/level event signal, corresponding to the first non-zero coefficient of the f-scale 8 layer, from f-scale 8 forward scanner 426. This run/level signal is passed to V/FWL f-scale 4 encoder 430 via switches 432 (closed when coeff_subset="1") and 433 (closed when fscale8_firstnz="1"). Depending upon the state of these switches, V/FWL f-scale 4 encoder 430 either multiplexes the f-scale 8 coefficient as the last coefficient of the f-scale 4 bitstream and generates a skip_firstnz signal to indicate that this has been done, or sends an end-of-block ("EOB") signal for f-scale 4 blocks. The output of V/FWL f-scale 4 encoder 430 is passed to switch 431.

If coeff_subset="0", the encoding of the coefficients from DCT-8 413 is as follows. The DCT-8 f-scale 4 coefficients are output on line 422 by coefficient splitter 416. The encoding of the f-scale 4 coefficients is the same as in the coeff_subset="1" case, however, the first non-zero f-scale 8 coefficient is not multiplexed into the f-scale 4 bitstream as switch 432 is open. F-scale 8 forward quantizer 419 receives input coefficients from differencer 420. The output of differencer 420 is the DCT-8 coefficients with the f-scale 4 coefficient subset differenced from the reconstructed representation of the f-scale 4 coefficients that were quantized and scanned by f-scale 4 forward quantizer 428 and f-scale 4 forward scanner 429. These coefficients are reconstructed by f-scale 4 inverse scanner 434 and f-scale 4 inverse quantizer 435 (which perform the inverse functions of f-scale 4 forward scanner 429 and f-scale 4 forward quantizer 428) and passed to differencer 420 via switch 436. As in the coeff_subset="1" case, the coefficients output by f-scale 8 forward quantizer 419 are passed to f-scale 8 forward scanner 426 and V/FWL f-scale 8 encoder 427.

In addition to transmitting encoded transform coefficients, V/FWL f-scale 8 encoder 427 and V/FWL f-scale 4 encoder 430 also encodes and transmits a number of control signals and overhead data within the output bitstream, including: the quant_parmtr signal, the quant_delta signal, the inter/intra signal, motion vectors, the picture_type signal, the s_t_comp signal output by spatial/temporal prediction analyzer 402, the dual/single_field_mc signal, the sif_slice signal, and the ccir_compat_slice signal. The V/FWL f-scale 4 and f-scale 8 encoders provide coding statistics information to coding statistics processor 425.

Switches 428 and 431 receive the output of V/FWL f-scale 8 encoder 427 and V/FWL f-scale 4 encoder 430 respectively. Each of these switches passes the output to compressed f-scale 4/f-scale 8 slice store ("compressed slice store") 437. The contents of compressed slice store 437 are passed to buffer 424 when the processing of a given slice is complete. Buffer 424 outputs the received bitstream at the appropriate rate for acceptance by video multiplexer 108 (FIG. 1).

Within the adaptive picture encoder of FIG. 4A-C, the SIF odd f-scale 8 slice is sent to spatial/f-scale 8 inverse scanner ("f-scale 8 inverse scanner") 438 and spatial/f-scale 8 inverse quantizer ("f-scale 8 inverse quantizer") 439; the SIF odd f-scale 4 slice is sent to f-scale 4 inverse scanner 434 and f-scale 4 inverse quantizer 435. If coeff_subset="1", the f-scale 8 and f-scale 4 inverse quantized coefficient subsets are merged by coefficient merger 440, the output of which is sent to f-scale 8 inverse discrete cosine transform circuit ("IDCT-8") 441. If coeff_subset="0", the f-scale 4 inverse quantized coefficients are added by summing element 442 to the corresponding inverse quantized difference coefficients within the f-scale 8 set upon closing of switches 406 and 444. The output of summing element 442 is passed to IDCT-8 441. IDCT 441 performs the inverse function of DCT-8 413 and outputs a decoded signal.

The decoded signal is added by summing element 443 to the prediction signal (evident at the negative input of differencer 412). The resulting signal is written to next picture store 444 via write_next switch 445 (if it is an I- or P-picture), and to reconstructed SIF one-slice store ("recon slice store") 446 via switch 404. The signal does not reach horizontal interpolator 447 as switch 409 is open as a result of the "0" value of the ccir_slice signal. Before the encoding of an I- or P-picture, the contents of next picture store 444 are transferred to previous picture store 448 via write_previous ("write_prev") switch 449.

Figure 7:
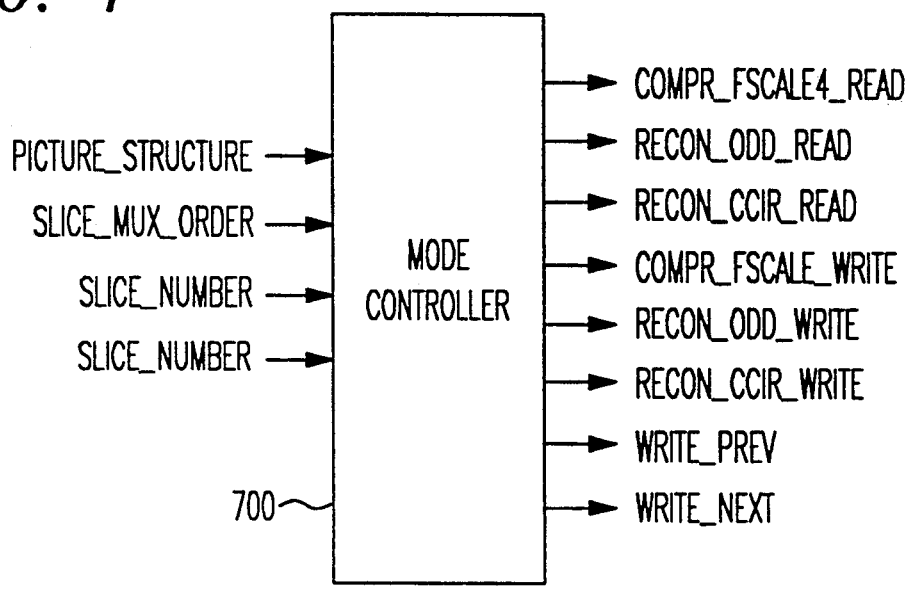
FIG. 7 shows, in simplified block diagram form, a read/write controller for the encoder of FIG. 4A-C.

The states of write_next switch 445 and write_prev switch 449 are controlled by read/write controller 700 (FIG. 7). As with mode controller 500, read/write controller 700 receives input signals from an independently running processor (not shown in FIG. 7). The input signals provided to read/write controller 700 include: picture_structure; slice_mux_order; slice_number, and fscale_mode (all of which were previously discussed). The output of read/write controller 700 provides bi-level ("0" or "1") control signals including: write_prev and write_prev and write_next signals which enable writing to the previous and next picture stores (447 and 444 of FIG. 4B); recon_odd_write and recon_ccir_write, which allow the storing of reconstructed odd video to the previous and next picture stores (FIG. 4B); recon_odd_read and recon_ccir_read, which allow reconstructed video to be read from the previous and next picture stores (FIG. 4B); and compr_fscale4_read and compr_fscale4_write, which allow compressed f-scale 4 and f-scale 8 data to be written and read from compressed slice store 437 (FIG. 4C). All of these "recon_" signals are related to the timing of events and can be derived at the decoder.

Figure 8:
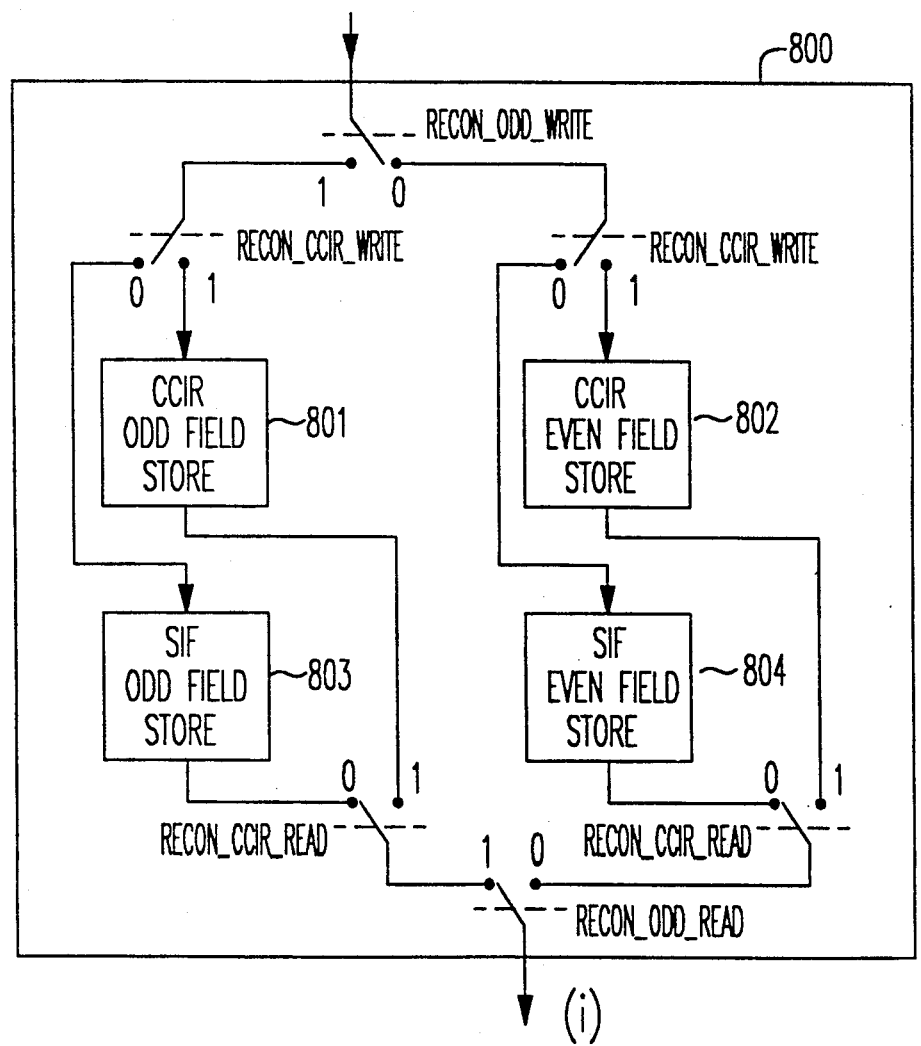
FIG. 8 shows, in simplified block diagram form, the internal architecture of a picture store within the encoder of FIG. 4A-C.

FIG. 8 shows a simplified block diagram of a picture store (800), one such store is employed for storing a previous picture, and another for storing a next picture within the adaptive picture encoder of FIG. 4A-C. As shown, picture store 800 contains a separate memory for CCIR-601 odd and even fields (801, 802), as well as separate memories for SIF odd and even fields (803, 804). Picture store 800 is configured to allow the storage and retrieval of pictures in response to read/write signals generated by read/write controller 700.

Figure 9:
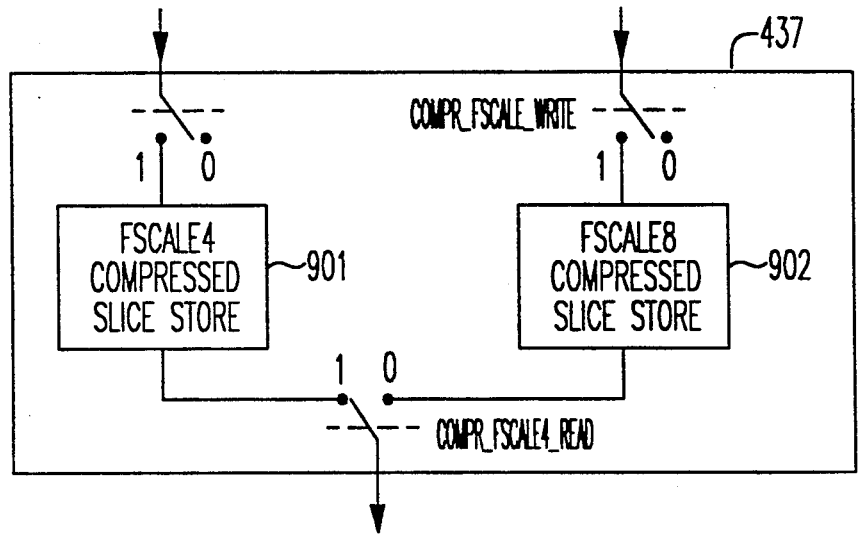
FIG. 9 shows, in simplified block diagram form, the internal architecture of a compressed slice store within the encoder of FIG. 4A-C.

FIG. 9 is a simplified block diagram showing the configuration of compressed slice store 437. As shown, picture store 437 contains a separate memory for f-scale 4 and f-scale 8 slices (901, 902). Compressed slice store 437 is configured to allow the storage and retrieval of pictures in response to read/write signals generated by read/write controller 700.

If the current picture being processed by the adaptive picture encoder of FIG. 4A-C is a P- or B-picture, motion estimator 450 generates motion vectors by finding the best match of the odd-field macroblocks input on line 401 with the decoded reference odd-field images in next and previous picture stores 444 and 448. Since encoding which is very similar to MPEG-1 encoding is used for SIF odd fields, only single field motion vectors are necessary. The motion vectors are sent to dual/single field motion compensated predictor ("dual/single field MC predictor") 451 which calculates a prediction of the video on line 401 based upon the received motion vectors, the contents of next and previous picture stores 444 and 448, and the picture_type signal. The prediction is output by dual/single field MC predictor 451 on line 452 and passed to switch 411 via switches 454 and 455 (as dual/single _field_mc and s_t_comp are set to "0"). This completes the f-scale 4 and f-scale 8 encoding of an SIF odd slice.

As is shown in FIG. 3A, the next slice to be encoded is a CCIR-601 odd slice. For encoding a CCIR-601 layer all modes are available and all analyzers are used (i.e., all "dis_" signals generated by mode controller 500 are set to "0"). The ccir_compat_slice signal generated by mode controller 500 is set to "1", and the sif_slice, en_fscale, coeff_subset, and sif_odd_slice signals generated by mode controller 500 are set to "0". The macroblocks representing the CCIR-601 odd slice are received via line 401. As with previously described encoding scheme, differencer 412 outputs a prediction error macroblocks. Each 8×8 block within each prediction error macroblock is converted into an 8×8 matrix of transform coefficients by DCT-8 413. The coefficients are then quantized and forward scanned by f-scale 8 forward quantizer 419 and f-scale 8 forward scanner 426. They are then passed to V/FWL f-scale-8 encoder 427, buffer 424, and video multiplexer 108 (FIG. 1), which perform as discussed earlier for f-scale 8 odd coding. The circuitry associated with f-scale 4 coding is basically disconnected during this process by opening of the appropriate switches.

In the local decoding loop of the encoder, the output of forward scanner is inverse scanned, inverse quantized and inverse transformed by f-scale 8 inverse scanner 438, f-scale 8 inverse quantizer 439, and IDCT-8 441 to reconstruct the quantized prediction error signal. This decoded error signal is added back to the prediction signal (evident at the negative input of differencer 442) by summing element 443 to generate a reconstructed CCIR-601 signal. This reconstructed signal is saved in next picture store 444 (if it is an I- or a P-picture).

The prediction signal for this macroblock was obtained through the following sequence of operations. Motion estimator 450 first compared the input macroblocks of CCIR-601 resolution on line 401 with the decoded reference CCIR-601 images within the previous and next picture stores 448 and 443. If it is an I-picture (as indicated by the picture—type signal, no motion estimation is performed. Motion estimator 450 computes two sets of motion vectors, one for dual field prediction mode and one for single field prediction mode. These motion vectors are sent to dual/single field MC predictor 451 which, based upon these vectors, computes the prediction for both cases (one being output on line 452, and the other on line 453). Dual/single field MCP analyzer 403 compares the two predictions and selects the one that gives a lower prediction error. A dual/single—field—mc signal is output by dual/single field MCP analyzer 403 so that switch 454 is directed to the output of dual/single field MC predictor 451 which offers the least prediction error. Since the ccir—compat—slice signal is set to "1", recon slice store 446 outputs the current SIF slice to horizontal interpolator 447 (which corresponds to horizontal interpolator 115 in FIG. 1). Spatial/temporal prediction analyzer 402 compares the interpolated SIF signal (spatial prediction) with the output of dual/single field MC predictor 451 (temporal prediction) to determine which signal gives a better estimate of the input video. Spatial/temporal prediction analyzer 402 outputs a compatibility signal (s—t—comp) to allow the best choice of spatial or temporal prediction to be passed to inter/intra analyzer 410. Inter/intra analyzer 410 determines whether intra-coding or inter-coding is to be used by comparing the variance of the signal on line 401 to the variance of the inter prediction signal computed using the prediction signal received from switch 455. The inter/intra signal opens switch 411 if intra-coding is selected or closes it if inter prediction is selected. This completes the loop for coding CCIR-601 odd slice.

The alternate encoding of SIF odd slices and CCIR-601 odd slices continues until the odd field is complete. Next the encoding of SIF even slices and CCIR-601 even slices is performed. The encoding of an SIF even slice is similar to that of a CCIR-601 slice except that for SIF even slice encoding the ccir—compat—slice signal generated by mode controller 500 is set to "0", and the dis—spatial signal generated by mode controller 500 is set to "1". This causes switch 409 to be opened and spatial/temporal prediction analyzer 402 to be disabled.

As shown in FIG. 3B, after an SIF even slice is encoded, a CCIR-601 even slice is encoded. This encoding is similar to that of a CCIR-601 odd slice, but a reconstructed SIF even slice stored in recon slice store 446 is interpolated and used as a spatial prediction. The alternate encoding of SIF even slices and CCIR-601 even slices continues until the even field is complete.

As discussed above, during an odd-field, video multiplexer 108 (FIG. 1) receives the bitstreams related to the f-scale 4 odd, f-scale 8 odd, and CCIR-601 odd slices; whereas during an even field it receives SIF even, and CCIR-601 even slices (see FIG. 3B). Video multiplexer 108 multiplexes these received signals and transmits them to video demultiplexer 117 (FIG. 1) where they are demultiplexed and passed on to decoders 118, 122, 126 and 131 (FIG. 1) for odd fields, and to decoders 126 and 131 (FIG. 1) for even fields.

Figure 10:
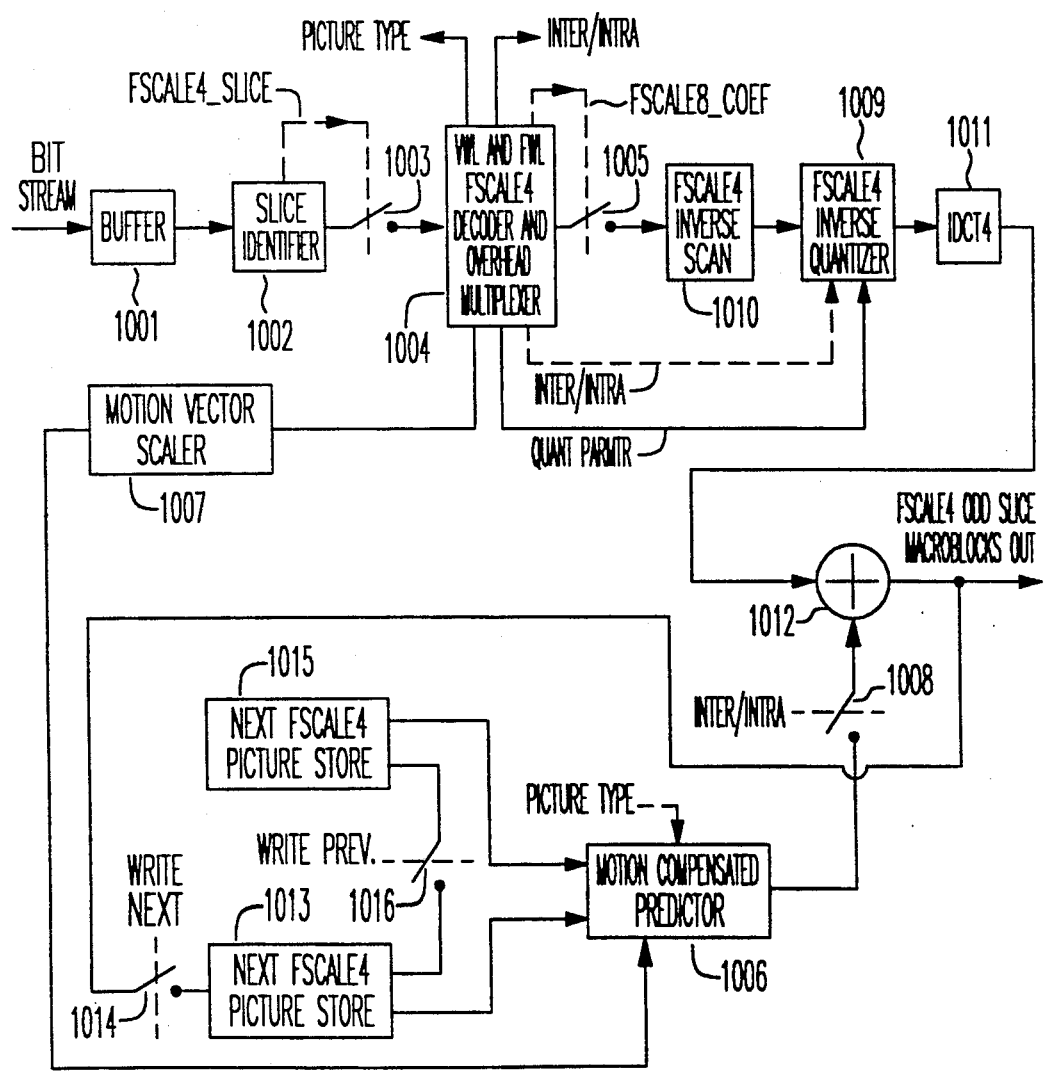
FIG. 10 shows, in simplified block diagram form, the internal architecture of a picture decoder which facilitates the decoding of an odd digital video signal bitstream frequency scaled to 4×4 blocks ("f-scale 4") in accordance with the example of the invention illustrated in FIG. 1.

FIG. 10 shows a simplified block diagram of the internal architecture of a picture decoder which facilitates the decoding of an f-scale 4 odd fields encoded by the encoder of FIG. 4A–C. A bitstream containing encoded coefficients representing an f-scale 4 odd video field is sent to buffer 1001 from video demultiplexer 117 (FIG. 1). This bitstream also contains the control signals and overhead data transmitted by V/FWL f-scale 4 encoder 430 (FIG. 4C). Buffer 1001 passes this signal to slice identifier 1002, which scans the bitstream for an fscale4—slice—start code (indicative of an f-scale 4 odd-field slice). In response to the detection of this code an fscale4—slice signal of "1" is generated which closes switch 1003, and inputs the bitstream to variable/fixed word length f-scale 4 decoder and overhead demultiplexer ("V/FWL f-scale 4 decoder") 1004. V/FWL f-scale 4 decoder 1004 discards any decoded f-scale 8 coefficient data (to implicitly represent an EOB) that may have been multiplexed with the f-scale 4 bitstream by opening switch 1005. V/FWL decoder 1004 decodes the control signals and overhead data within the bitstream, including: the picture—type signal, which is sent to motion compensated predictor 1006; the motion vectors, which are sent to motion vector scaler 1007; the inter/intra signal, which is sent to switch 1008 and to f-scale 4 inverse quantizer 1009; and the quant—parmtr signal, which is sent to f-scale 4 inverse quantizer 1009. The V/FWL decoder outputs the coefficient related data of the encoded video signal to f-scale 4 inverse scanner 1010 which rearranges the coefficients and passes them to the f-scale 4 inverse quantizer 1009. Based upon received control information, f-scale 4 inverse quantizer 1009 reverses the operation performed by f-scale 4 forward quantizer 428 (FIG. 4A). The output of inverse quantizer 1009 is inversely transformed by f-scale 4 inverse discrete cosine transform circuit ("IDCT-4") 1011 and added, by summing element 1012, to a prediction signal received from switch 1008. The output of summing element 1012 is the reconstructed f-scale 4 odd slice macroblock. This reconstructed macroblock is also stored in next picture store 1013 if it is an I- or a P-picture. Write—next switch 1014 is closed if the current field is an I- or P-picture (as determined from the picture—type signal). Before decoding of I- or P-picture, the contents of next picture store 1013 are transferred to previous picture store 1015 upon closing of write—prev switch 1016.

Motion compensated predictor 1006 computes the prediction of the current signal based on the picture—type signal, the contents of next and previous picture stores 1013 and 1015, and the received motion vectors. The motion vectors decoded by the V/FWL f-scale 4 decoder 1004 and sent to motion vector scaler 1007 were originally computed for f-scale 8, and must be scaled down for the f-scale 4 decoding by motion vector scaler before they can be used by motion compensated predictor 1006 (unless independent motion vectors are sent for each scale). The prediction signal output by motion compensated predictor 1006 is added to the f-scale 4 odd slice macroblock passing through summing element 1012 if the current picture being decoded is inter coded (inter/intra set to "1", and switch 1008 closed). However, if the current picture being decoded is intra coded (inter/intra set to "0", and switch 1008 opened), a signal of zero is added to the reconstructed f-scale 4 odd slice macroblock passing through summing element 1012.

Figure 11:
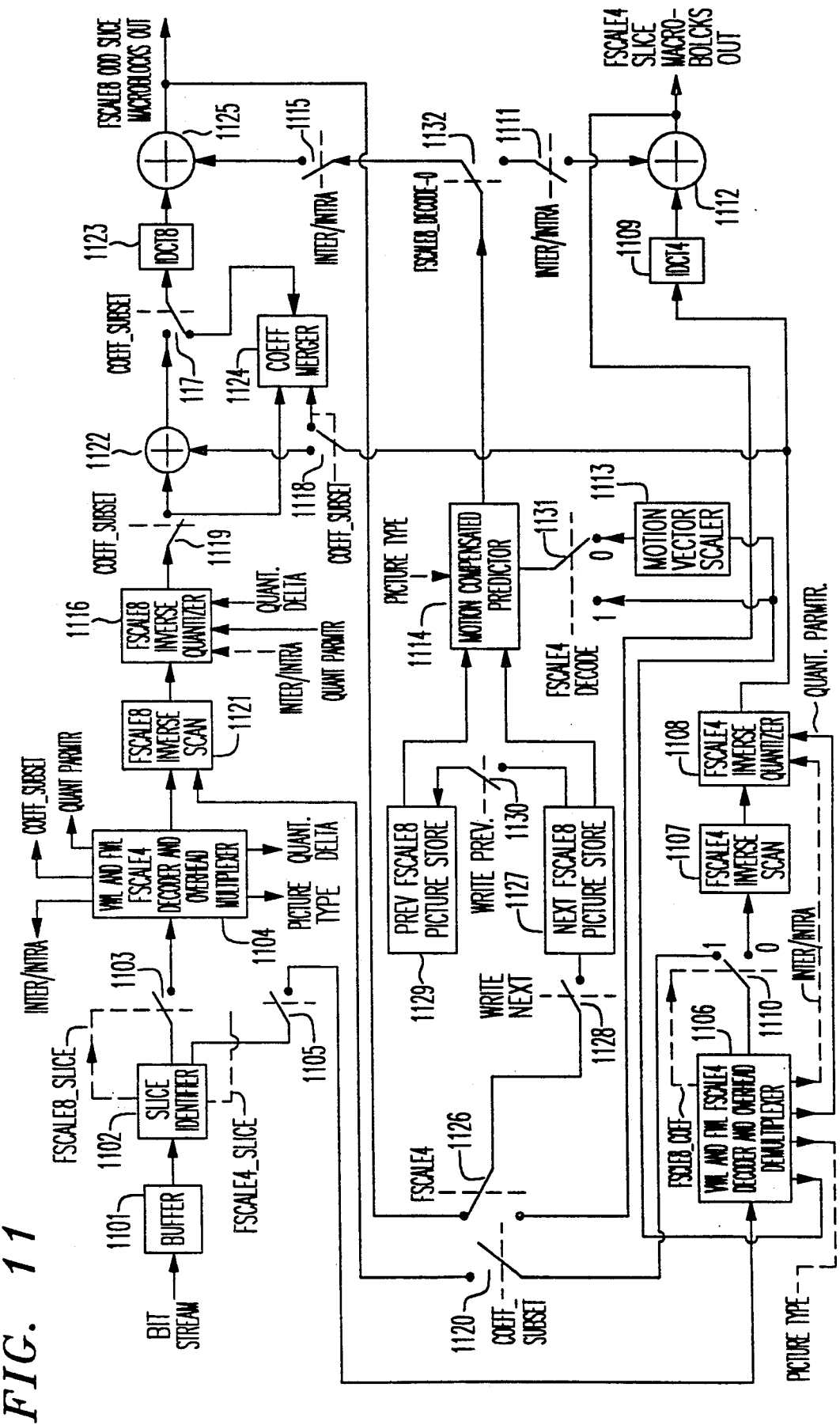
FIG. 11 shows, in simplified block diagram form, the internal architecture of a picture decoder which facilitates the decoding of an odd digital video signal bitstream frequency scaled to both 8×8 blocks ("f-scale 8"), in accordance with the example of the invention illustrated in FIG. 1.

FIG. 11 shows a simplified block diagram of the internal architecture of a picture decoder which facilitates the decoding of a f-scale 8 odd field video signal encoded by the encoder of FIG. 4A-C. In the simplest case, this decoder can be an MPEG-1 decoder modified to decode frequency scales. In the general case shown in FIG. 11, the decoder contains two loops with shared motion compensation circuitry, one dedicated to decode f-scale 4 and the other dedicated to decode f-scale 8 using assistance from information available in f-scale 4. If only f-scale 4 is selected for decoding, the f-scale 8 part of the circuitry remains idle. Otherwise, both loops will be decoding the simultaneously. The f-scale 4 loop needs only to produce dequantized coefficients, not decoded f-scale 4 video. An incoming bitstream passes through buffer 1101 and slice identifier 1102. Slice identifier 1102 scans the bitstream for an fscale8_start_code and/or an fscale4_start code. Upon finding the fscale8_start_code, slice identifier 1102 sets the fscale8_slice signal to "1" (indicative of an f-scale 8 odd bitstream), and in response closes switch 1103, and inputs the bitstream to V/FWL f-scale 8 decoder 1104. Upon finding the fscale4_start_code, slice identifier 1102 sets the fscale4_slice signal to "1" (indicative of an f-scale 4 odd bitstream), and in response closes switch 1105, and inputs the bitstream to V/FWL f-scale 4 decoder 1106. The f-scale 4 decoding circuitry (which includes V/FWL f-scale 4 decoder 1106, f-scale 4 inverse scanner 1107, f-scale 4 inverse quantizer 1108, IDCT-4 1109, switches 1110 and 1111, summing element 1112, motion vector scaler 1113, and motion compensation circuitry) operates in the same fashion as the decoder of FIG. 10, and will not be discussed here.

V/FWL f-scale 8 decoder 1104 decodes the control signals and overhead data within the bitstream, including: the picture_type signal, which is sent to motion compensated predictor 1114; the inter/intra signal, which is sent to switch 1115 and to f-scale 8 inverse quantizer 1116; the quant-parmtr and quant-delta signals, which are sent to f-scale 8 inverse quantizer 1116, and the coeff_subset signal, which controls switches 1117, 1118, 1119 and 1120. V/FWL f-scale 8 decoder outputs the coefficient related data of the encoded f-scale 8 video signal to f-scale 8 inverse scanner 1121 which rearranges the coefficients and passes them to the f-scale 8 inverse quantizer 1116. Based upon received control information, f-scale 8 inverse quantizer 1116 reverses the operation performed by f-scale 8 forward quantizer 419 (FIG. 4C). If the f-scale 8 coefficients contain the entire set of coefficients (i.e., they contain difference coefficients corresponding to f-scale 4 and coeff_subset="0"), the f-scale 4 inverse quantized coefficients are added back to appropriate f-scale 8 inverse quantized coefficients by summing element 1122 upon the closing of switches 1118 and 1119. The output of summing element 1122 is fed to IDCT-8 1123 via switch 1117. If the f-scale 4 and f-scale 8 coefficients contain disjoint sets (coeff_subset="1"), these inverse quantized coefficients are merged together in coefficient merger 1124 before being sent to IDCT-8 1123. If f-scale 8 decoding is selected, no further decoding of the f-scale 4 coefficient data is performed; if this is not the case IDCT-4 1109 continues to decode the f-scale 4 coefficient data in a manner similar to the decoder of FIG. 10. The output of IDCT-8 1123 is added, by summing element 1124, to a prediction signal received from switch 1115. The output of summing element 1124 is the reconstructed f-scale 8 odd slice macroblock. If f-scale 8 decoding is being performed an fscale4_decode signal of "0" is generated at the decoder. This causes switch 1126 to allow the reconstructed f-scale 8 macroblock to be stored in next picture store 1127 if it is an I- or a P-picture. Write_next switch 1128 is closed if the current field is an I- or P-picture (as determined from the picture_type signal). Before decoding of I- or P-picture, the contents of next picture store 1127 are transferred to previous picture store 1129 upon closing of write_prev switch 1130.

Motion compensated predictor 1114 computes the prediction of the current signal based on the picture_type signal, the contents of next and previous picture stores 1127 and 1129, and motion vectors received from V/FWL f-scale 4 decoder 1106 via switch 1131. The prediction signal output by motion compensated predictor 1114 is added to the f-scale 8 odd slice macroblock passing through summing element 1124 if the current picture being decoded is inter coded (inter-/intra set to "1", and switch 1115 closed; fscale4_code="0", and switch 1132 set to "0"). However, if the current f-scale 8 picture being decoded is intra coded (inter/intra set to "0", and switch 1115 open; fscale4_code="0", and switch 1132 set to "0"), a signal of zero is added to the reconstructed f-scale 8 odd slice macroblock passing through summing element 1124.

Figure 12:
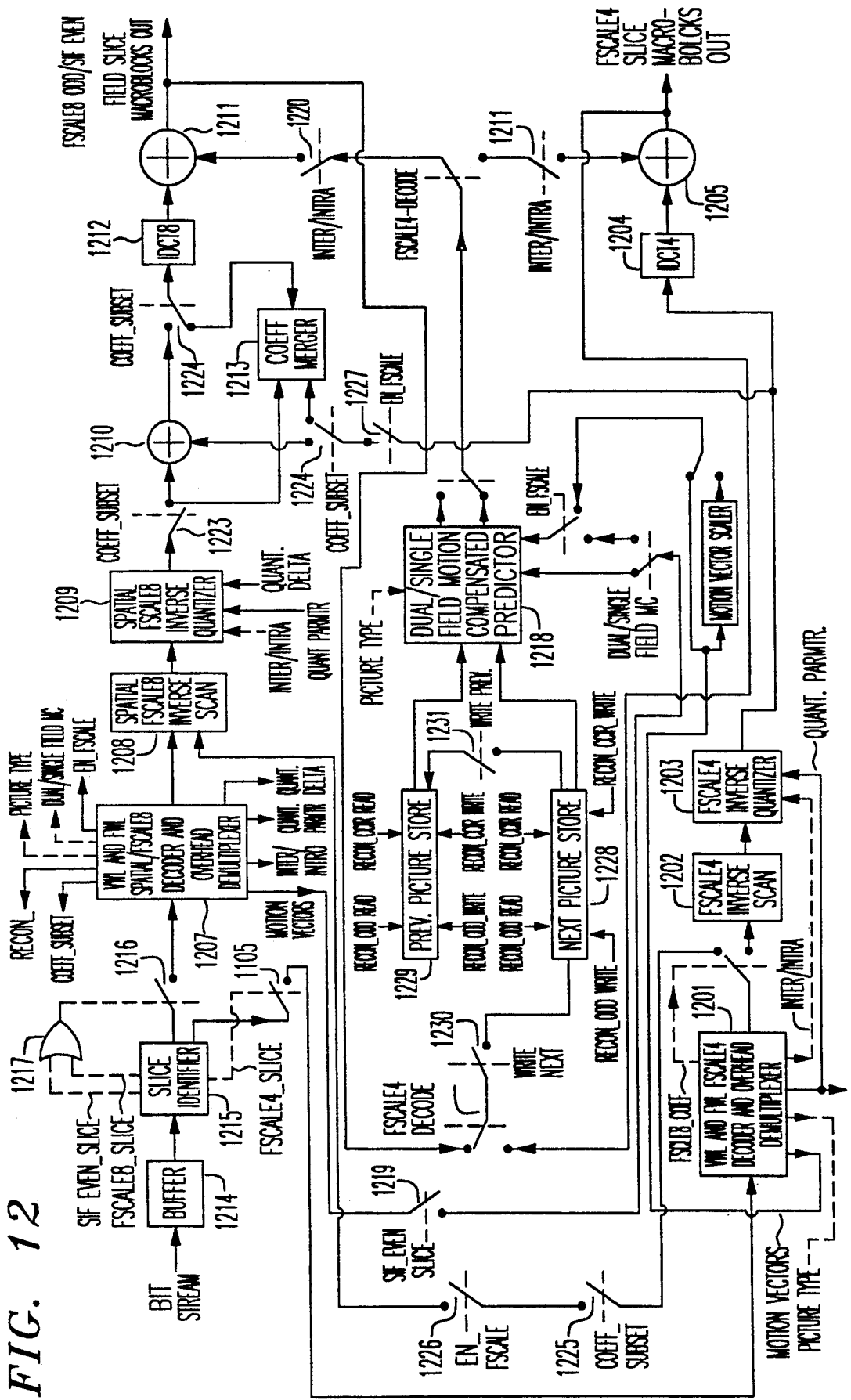
FIG. 12 shows, in simplified block diagram form, the internal architecture of a picture decoder which facilitates the decoding of Source Intermediate Format (SIF) even digital video signals in accordance with the example of the invention illustrated in FIG. 1.

FIG. 12 shows a decoder capable of decoding SIF even fields, frequency scale-8 and frequency scale-4 layers. Whenever a scale is selected for decoding, all lower layers must also be decoded. The f-scale 4 decoding circuitry (which includes V/FWL f-scale 4 decoder 1201, f-scale 4 inverse scanner 1202, f-scale 4 inverse quantizer 1203, IDCT-4 1204, summing element 1205, motion vector scaler 1206, and motion compensation circuitry) operates in the same fashion as the decoder of FIG. 10, and will not be discussed here. Similarly, the f-scale 8 decoding circuitry (which includes V/FWL spatial/f-scale 8 decoder 1207, spatial/f-scale 8 inverse scanner 1208, spatial/f-scale 8 inverse quantizer 1209, summing elements 1210 and 1211, IDCT-8 1212, coefficient merger 1213, and motion compensation circuitry) operates in the same fashion as the f-scale 8 decoding circuitry of FIG. 11, and will not be discussed with respect to f-scale 8 decoding here.

In decoding an SIF even layer an incoming bitstream from video demultiplexer 117 (FIG. 1) passes through buffer 1214 and slice identifier 1215. Slice identifier 1215 scans the bitstream for an fscale8_start_code, an fscale4_start_code, and an sif_even_slice start_code. Upon finding the sif_even_slice_start_code, slice identifier 1215 sets the sif_even_slice signal to "1" (indicative of an sif even bitstream). In response to this signal being "1", switch 1216 is closed by a signal from OR-gate 1217, and the bitstream is input to V/FWL spatial/f-scale 8 decoder 1207. V/FWL spatial/f-scale 8 decoder 1207 decodes the control signals and overhead data within the bitstream, including: the picture_type signal, which is sent to dual/single motion compensated predictor ("dual/single field MC predictor") 1218; the motion vectors, which are sent to switch 1219; the inter-/intra signal, which controls switch 1220 and spatial/f-scale 8 inverse quantizer 1209; the quant_parmtr and quant_delta signals, which are sent to spatial/f-scale 8 inverse quantizer 1209; the dual/single_field_mc signal, which controls switches 1221 and 1222; the coeff_subset signal, which controls switches 1223, 1224 and 1225; the en_fscale signal, which controls switches 1226 and 1227; and the recon_odd_write, recon_odd_read recon_ccir_write, and recon_ccir_read signals which are setn to next and previous pictures stores 1228 and 1229. The signals en_fscale and coeff_subset are set to "0" for decoding an even SIF field.

For an SIF even slice macroblock, V/FWL spatial/f-scale 8 decoder 1207 outputs the coefficient related data of encoded SIF even video to spatial/f-scale 8 inverse scanner 1208, spatial/f-scale 8 inverse quantizer 1209. As coeff_subset is "0", the output of spatial/f-scale 8 inverse quantizer 1209 is passed to summing element 1210, however it passes unaltered through summing element 1210 as switch 1227 is open (en_fscale="0"). The output of summing element 1210 is passed via switch 1224 to IDCT-8 1212. The output of IDCT-8 1212 is added, by summing element 1211, to a prediction signal received from switch 1220. The resulting decoded SIF even slice macroblock is written into next picture store 1228 via write_next switch 1230 if it is an I- or a P-picture. Before decoding of I- or P-picture, the contents of next picture store 1228 are transferred to previous picture store 1229 via the closing of write_prev switch 1231. The dual/single_field_mc signal directs the motion vectors output by V/FWL spatial/f-scale 8 decoder 1207 to the appropriate input of dual/-single field MC predictor 1218, which computes a prediction for the selected mode. If an inter-coded picture is being decoded, switch 1220 passes the prediction data to summing element 1211, where it is added to the output signal of IDCT-8 1212. However, if the current picture being decoded is intra coded (inter/intra set to "0", and switch 1220 opened), a signal of zero is added to the decoded macroblock passing through summing element 1211.

Figure 13A:
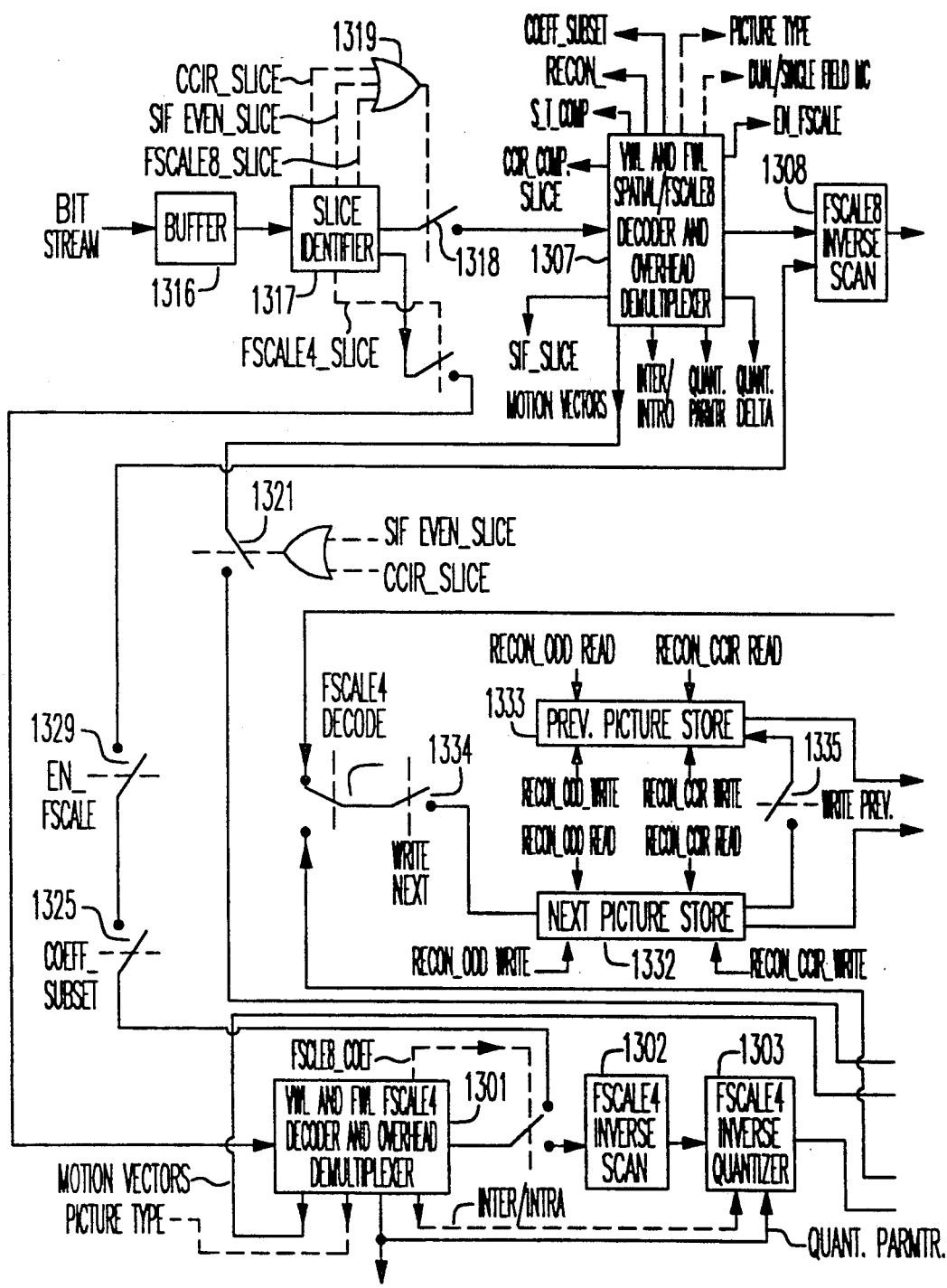
FIG. 13A-B show, in simplified block diagram form, the internal architecture of a picture decoder which facilitates the decoding of CCIR-601 odd, and CCIR-601 even digital video signals in accordance with the example of the invention illustrated in FIG. 1.
Figure 13B:
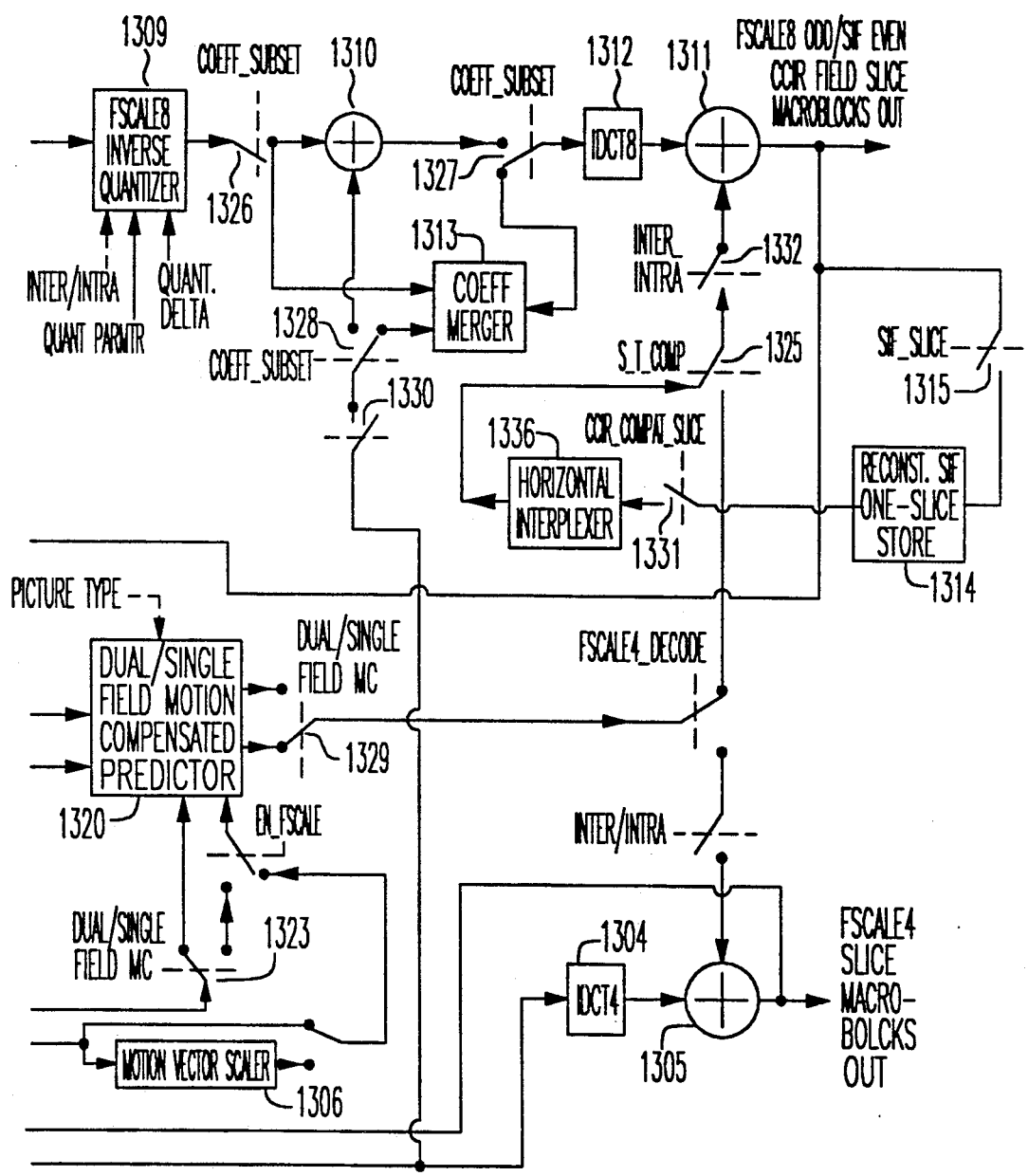

FIG. 13A-B show a simplified block diagram of the internal architecture of a picture decoder which facilitates the decoding of a high-resolution digital video signal encoded by the encoder of FIGS. 4A-C. This decoder can decode CCIR-601 odd, CCIR-601 even, SIF even, f-scale 8 and f-scale 4 fields. The f-scale 4 decoding circuitry (which includes V/FWL f-scale 4 decoder 1301, f-scale 4 inverse scanner 1302, f-scale 4 inverse quantizer 1303, IDCT-4 1304, summing element 1305, motion vector scaler 1306, and motion compensation circuitry) operates in the same fashion as the decoder of FIG. 10, and will not be discussed here. Similarly, the f-scale 8/SIF even decoding circuitry (which includes V/FWL spatial/f-scale 8 decoder 1307, spatial/f-scale 8 inverse scanner 1308, spatial/f-scale 8 inverse quantizer 1309, summing elements 1310 and 1311, IDCT-8 1312, coefficient merger 1313, and motion compensation circuitry) operates in the same fashion as the f-scale 8 decoding circuitry of FIG. 11 and the SIF even decoding circuitry of FIG. 12, and will not be discussed with respect to f-scale 8 of SIF even decoding here. However, there is one difference in decoding f-scale 8 and SIF even slices within the decoder of FIGS. 13A-B. Decoded f-scale 8 and SIF even slices output by summing element 1311 are stored in reconstructed SIF slice store 1314 when switch 1315 is closed. This allows the optional spatial prediction to be performed for the corresponding CCIR odd and even slices.

An incoming bitstream passes through buffer 1316 and slice identifier 1317. Slice identifier 1317 scans the bitstream for a ccir_slice_start code, and upon finding it sets the ccir_slice signal to "1" (indicative of a CCIR-601 odd or even slice). In response to this signal being "1", switch 1318 is closed by a signal from OR-gate 1319, and the bitstream is input to V/FWL spatial/f-scale 8 decoder 1307. V/FWL spatial/f-scale 8 decoder 1307 decodes the control signals and overhead data within the bitstream, including: the picture_type signal, which is sent to dual/single motion compensated predictor ("dual/single field MC predictor") 1320; the motion vectors, which are sent to switch 1321; the inter-/intra signal, which is controls switch 1322 and spatial/f-scale 8 inverse quantizer 1309; the quant_parmtr signal, which are sent to spatial/f-scale 8 inverse quantizer 1309; the dual/single_field_mc signal, which controls switches 1323 and 1324; the s_t_comp signal, which controls switch 1325; the coeff_subset signal, which controls switches 1326, 1327 and 1328, the en_fscale signal, which controls switches 1329 and 1330; the ccir_compat_slice signal, which controls switch 1331; the sif_slice signal, which controls switch 1315; and the recon_odd_write, recon_odd_read recon_ccir_write, and recon_ccir_read signals which are sent to next and previous pictures stores 1332 and 1333. The signals en_fscale, coeff_subset are set to "0" for decoding a CCIR-601 slice.

For a CCIR-601 slice macroblock, V/FWL spatial/f-scale 8 decoder 1307 outputs the coefficient related data of encoded CCIR-601 video to spatial/f-scale 8 inverse scanner 1308, spatial/f-scale 8 inverse quantizer 1309. As coeff_subset is "0", the output of spatial/f-scale 8 inverse quantizer 1309 is passed to summing element 1310, however it passes unaltered through summing element 1310 as switch 1330 is open (en_fscale="0"). The output of summing element 1310 is passed via switch 1327 to IDCT-8 1312. The output of IDCT-8 1312 is added, by summing element 1311, to a prediction signal received from switch 1322. The resulting decoded CCIR slice macroblock is written into next picture store 1332 via write_next switch 1334 if it is an I- or a P-picture. Before decoding of I- or P-picture, the contents of next picture store 1332 are transferred to previous picture store 1333 via the closing of write_prev switch 1335. The dual/single_field_mc signal directs the motion vectors output by V/FWL spatial/f-scale 8 decoder 1307 to the appropriate input of dual/-single field MC predictor 1320, which computes a prediction for the selected mode. Switch 1331 is closed for all CCIR-601 slices which employ spatial prediction (indicated by a ccir_compat_slice signal of "1"). When switch 1331 is closed, the SIF slice in recon slice store 1314 is interpolated by horizontal interpolator 1336 and passed to switch 1325. Switch 1325 allows either the spatial prediction consisting of the interpolated reconstructed SIF slice, or the temporal prediction output by dual/single field MC predictor 1320 to be used for the current CCIR-601 signal (depending upon the s_t_comp signal decoded by V/FWL spatial/f-scale 8 decoder 1307). The ccir_compat_slice signal is always "1" for CCIR-601 slices as both CCIR-601 odd and even slices employ optional spatial prediction. If an inter-coded picture is being decoded, switch 1322 passes the prediction data to summing element 1311 where it is added to the signal output by IDCT-8 1312. However, if the current picture being decoded is intra coded (inter/intra set to "0", and switch 1322 opened), a signal of zero is added to the reconstructed macroblock passing through summing element 1311. This completes the CCIR field decoding loop.

Figure 14:
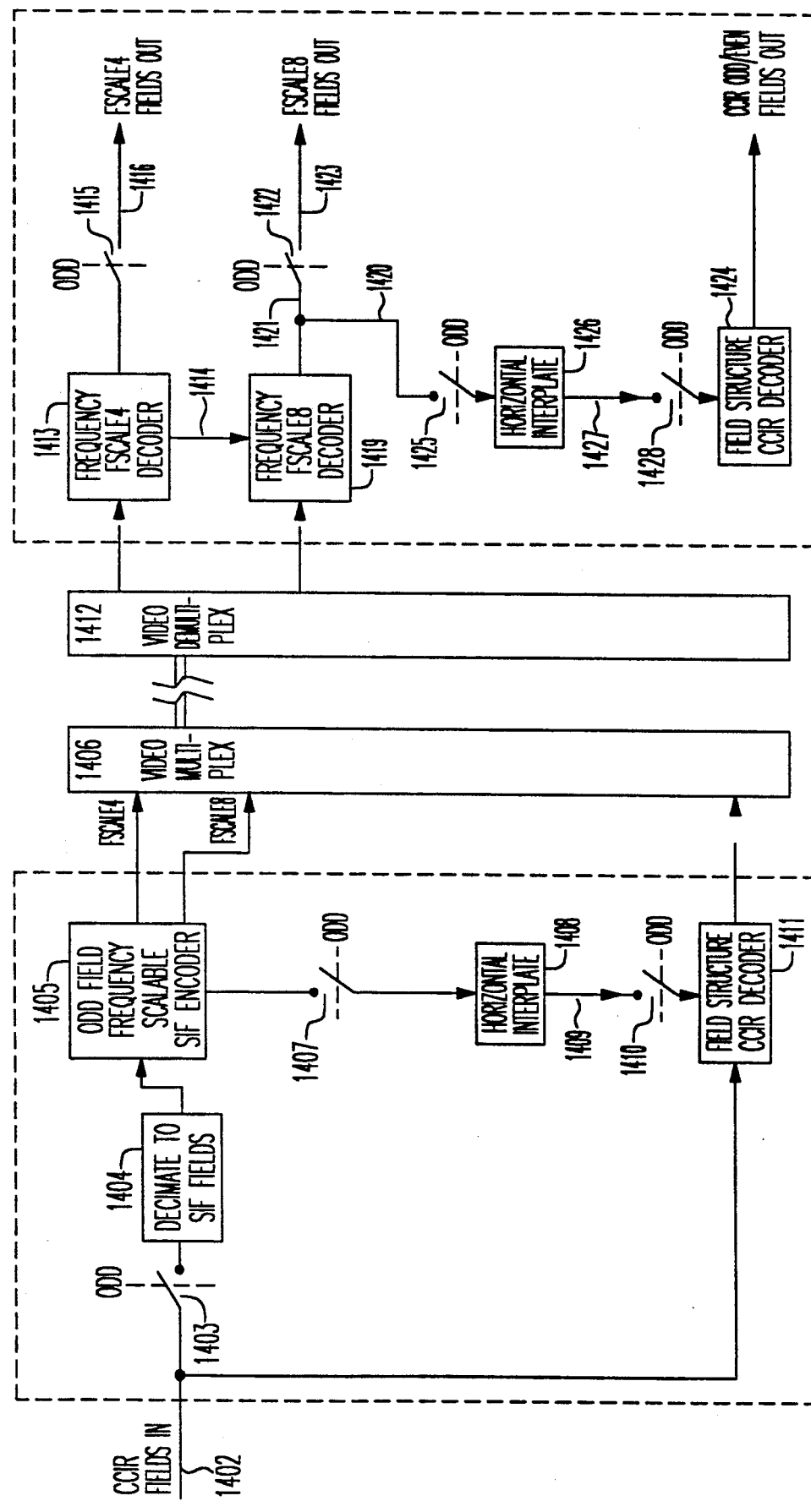
FIG. 14 shows, in simplified block diagram form, an illustration of a video signal encoding/decoding system in accordance with a second example of this invention.

A video signal encoding/decoding system, in accordance with a second example of the invention, is shown in FIG. 14. This system facilitates the field encoding and decoding of a digital video signal having three layers of spatial resolution for odd fields, and one layer for even fields. Signal encoding is performed within functional block 1400, and signal decoding is performed within functional block 1401. Layer 1 consists of SIF odd fields encoded in an f-scale 4 bitstream. Layer 2 consists of SIF odd fields encoded in an f-scale 8 bitstream. For odd fields, layer 3 consists of CCIR-601 odd field-structured pictures which are encoded using an adaptive choice of temporal prediction from previous coded pictures, and a spatial prediction corresponding to a current temporal reference obtained by interpolating an f-scale 8 odd field. For even fields there is only one layer (layer 3) consisting of CCIR-601 even field-structured pictures which are encoded using a temporal prediction from previous coded pictures.

As shown in FIG. 14, the digital video signal received on line 1402 is input to switch 1403, which directs odd fields to decimator 1404. The decimated SIF odd fields are output by decimator 1404 to odd field frequency scalable SIF encoder ("SIF frequency encoder") 1405, where they are f-scale 4 encoded, and f-scale 8 encoded. In the simplest case this SIF frequency encoder can be an MPEG-1 encoder modified to perform frequency scaling. The bitstream corresponding to each f-scaled encoded field is then sent to video multiplexer 1406 (the encoded f-scale 4 bitstream corresponds to the first video layer, the encoded f-scale 8 bitstream corresponds to the second video layer). SIF frequency encoder 1405 also outputs a decoded SIF odd signal to switch 1407. Switch 1407 allows a decoded odd field to be input to horizontal interpolator 1408 when an odd CCIR-601 field is being encoded. The decoded odd field is upsampled by horizontal interpolator 1408 to CCIR-601 resolution, and output via line 1409. Switch 1410 allows this upsampled odd field to be passed to field-structure CCIR-601 encoder 1411 (when an odd field is being decoded), where it is used for obtaining a spatial prediction of the third video layer. The resulting encoded bitstream (corresponding to the third video layer) is output by field-structure CCIR-601 encoder 1411 to video multiplexer 1406.

Video multiplexer 1406 multiplexes the encoded bitstreams into a single bitstream. This single bitstream is transmitted to video demultiplexer 1412 where it is demultiplexed into individual bitstreams. Frequency scale 4 SIF odd decoder ("f-scale 4 decoder") 1413 decodes the bitstream corresponding to the f-scale 4 encoded odd field of the first video layer, and outputs the decoded signal to line 1414 and switch 1415. Switch 1415 closes when an odd field is being decoded to allow the output of f-scale 4 decoder 1413 to reach output line 1416. Frequency scale 8 SIF odd decoder ("f-scale 8 decoder") 1419 decodes the bitstream corresponding to the f-scale 8 encoded odd field of the second video layer, thereby reconstructing an f-scale 8 SIF odd field video signal which is output on lines 1420 and 1421. If an odd field is being decoded, switch 1422 closes and allows output of the f-scale 8 odd field on line 1423. Field-structured CCIR-601 decoder 1424 decodes the bitstream corresponding to the third video layer (employing an optional spatial prediction based upon the interpolated decoded SIF odd fields from layer two if an odd field is being decoded) to reconstruct a CCIR-601 video signal which is output on line 132. Switch 1425 allows a decoded odd f-scale 8 field to be input to horizontal interpolator 1426 if an odd CCIR-601 field is being decoded. The f-scale 8 odd field is upsampled by horizontal interpolator 1426 to CCIR-601 field resolution, and output via line 1427. If an odd field is being decoded, switch 1428 closes and allows the upsampled odd field to be passed to field-structure CCIR-601 decoder 1424, where it is used for obtaining a spatial prediction of the third video layer. If an even field is being decoded, no such spatial prediction is allowed (switch 1428 remains open).

Figure 15B:
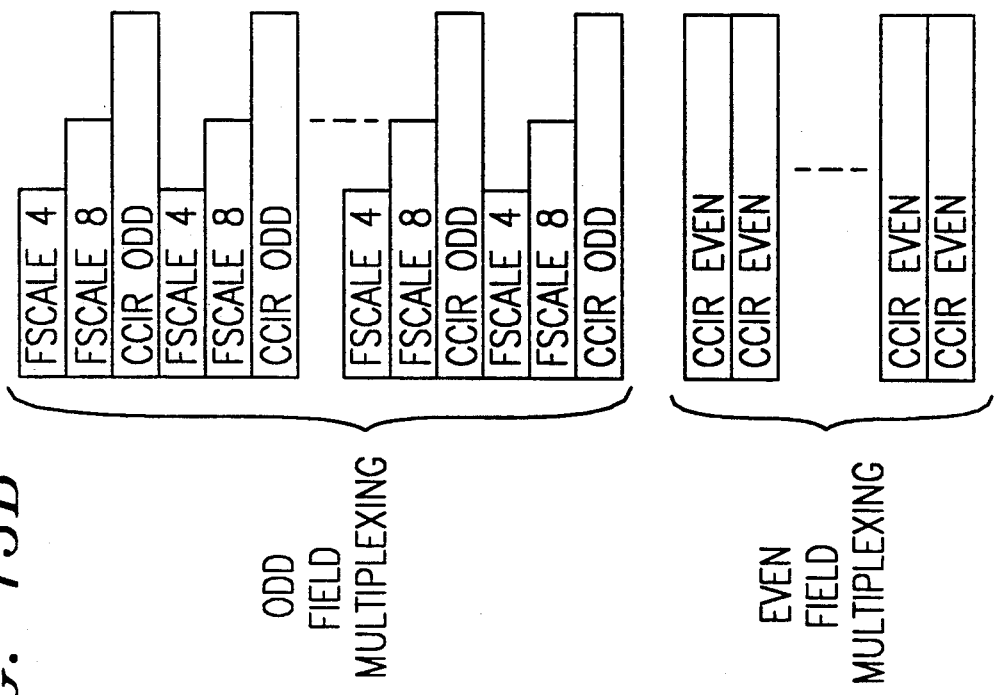
FIG. 15B is a pictorial representation of the bitstream slice structure output as a result of the encoding performed in accordance with the example of the invention illustrated in FIG. 14.
Figure 15A:
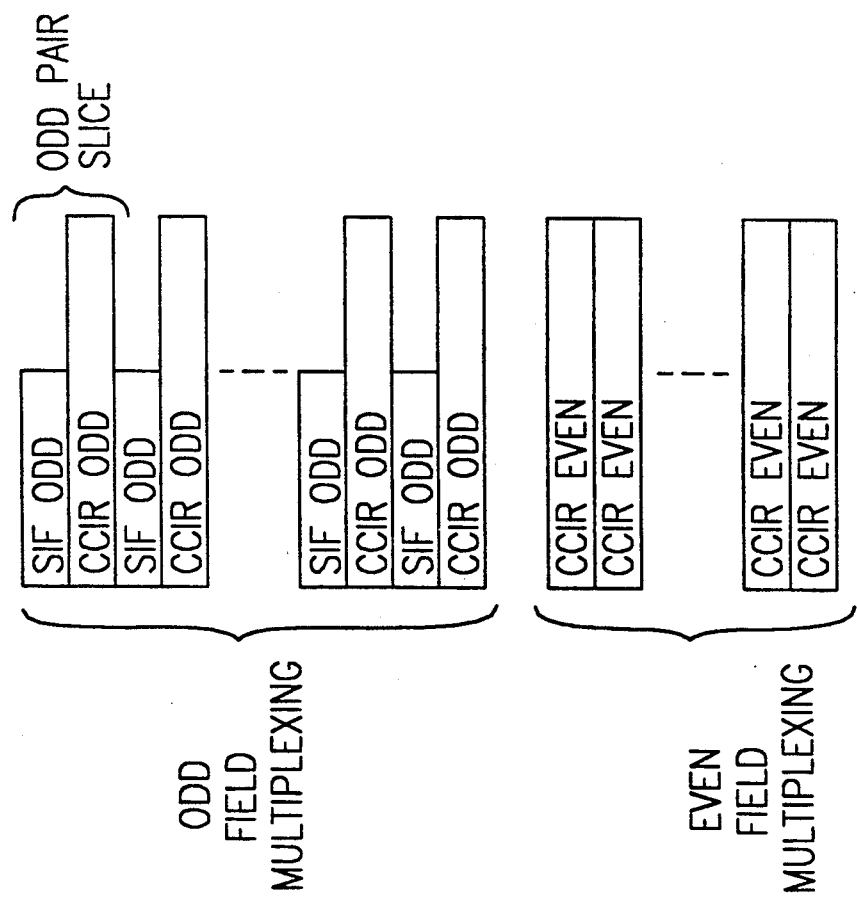
FIG. 15A is a pictorial representation of the video data slice structure input to the digital video encoding system illustrated in FIG. 14.

A representation of the slice structure employed in the encoding performed within functional block 1400 of FIG. 1 is shown in FIG. 15A. The slice multiplexing of the input picture starts with an odd field, followed by an even field. Within each odd field, both slices of any given SIF/CCIR-601 slice pair correspond to the same strip of picture. The slice of the lower resolution layer (SIF odd) is multiplexed before the slice of the higher resolution layer. Within each even field, all slices are CCIR-601 resolution. All slices consist of one or more macroblocks, which in turn consist of blocks of pixels. FIG. 15B shows the slice multiplexing structure of the bitstream output as a result of the encoding performed within functional block 1400. This multiplexing structure is basically identical to that of FIG. 15A, except that each SIF odd input slice produces f-scale 4 and f-scale 8 bitstream slices. This results in a trio of odd field slices: f-scale 4, f-scale 8, and CCIR-601. The slices of different layers are multiplexed to facilitate easy decoding. The slices are arranged so that all the information from lower resolution layers needed to decode a higher resolution layer is made available prior to the initiation of high resolution layer decoding. Therefore, compressed slices of lower layers are multiplexed first. Note that the even field encoder output (FIG. 15B) has no frequency scales.

Although FIG. 14 shows two separate encoders being employed to accomplish the encoding of the various video layers, in a particular embodiment of the invention, the encoding for all three layers may be accomplished within a single adaptive encoder. An example of such an adaptive encoder is shown in FIGS. 4A-C. The f-scale 4, f-scale 8, and CCIR-601 encoding of odd fields is performed in a manner identical to that described for FIGS. 4A-C. The encoding of the CCIR-601 layer for even fields is performed in a manner similar to that described in FIGS. 4A-C. However, since SIF even slices are not available, the CCIR-601 even slices are encoded without spatial prediction.

Figure 16:
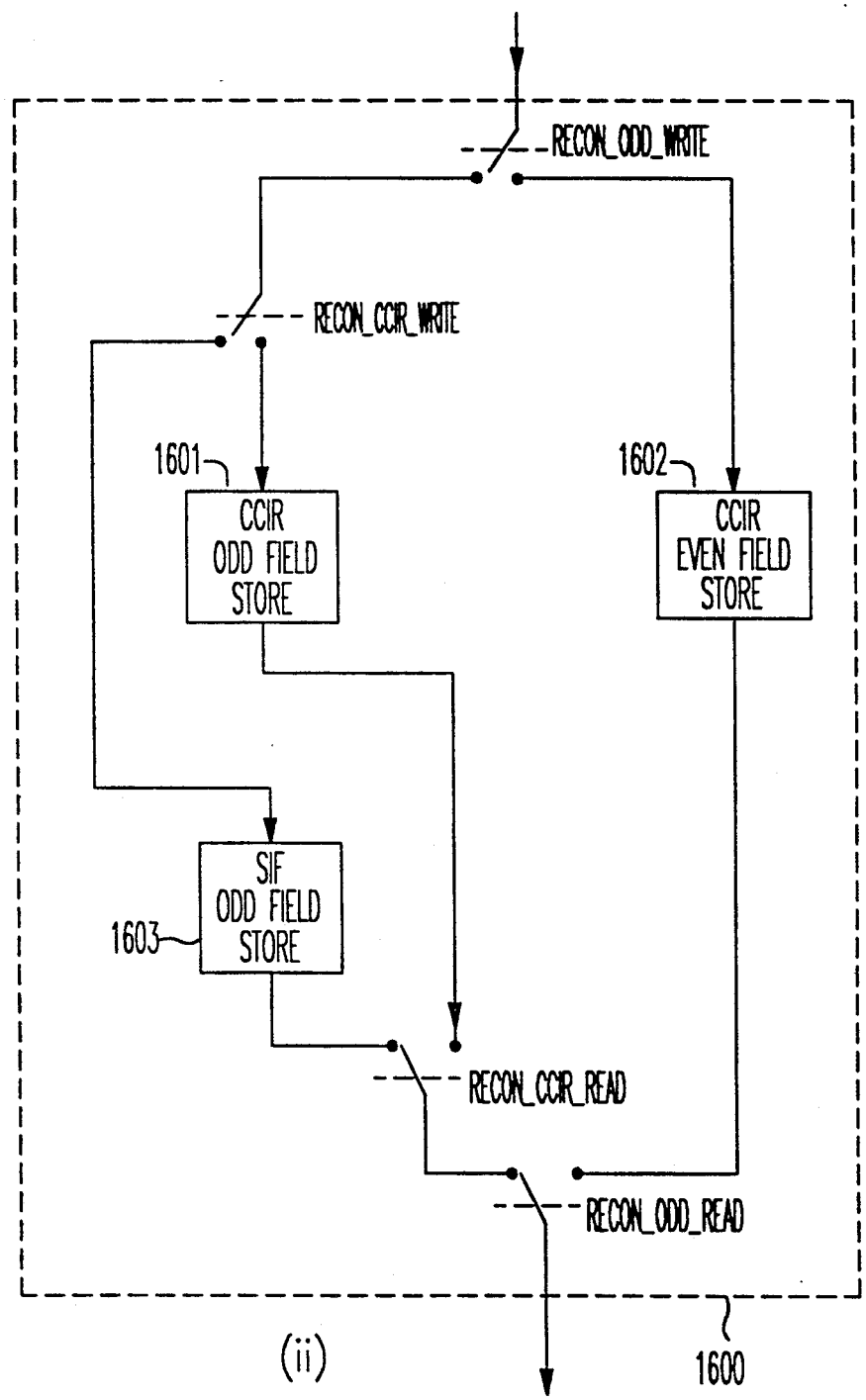
FIG. 16 shows, in simplified block diagram form, the internal architecture of a picture store within the encoder of FIG. 14.

FIG. 16 shows a simplified block diagram of a picture store (1600), one such store is employed for storing a previous picture, and another for storing a next picture within an adaptive picture encoder that facilitates the encoding performed within functional block 1400 of FIG. 14. As shown, picture store 1600 contains a separate memory for CCIR-601 odd and even fields (1601, 1602), as well as a separate memory for SIF odd fields (1603).

The above-described invention provides a practical method for encoding and decoding video signals in a manner which allows the transmission, reception, storage, or retrieval of a video signal providing multiple layers of resolution. It will be understood that the particular methods described are only illustrative of the principles of the present invention, and that various modifications could be made by those skilled in the art without departing from the scope and spirit of the present invention, which is limited only by the claims that follow. Such modifications would include encoding and decoding schemes involving more than three resolution layers, or schemes that apply the principles of the invention to code progressive (i.e., non-interlaced) video (such as that being proposed as an HDTV standard) in a spatially/frequency scalable manner.

We claim:

1. Apparatus for encoding digital video signals, comprising:
    means for receiving a digital video input signal including a succession of digital representations related to picture elements of a video image;
    means for coding a reduced resolution digital signal related to the picture elements of said video image by frequency scaling said received digital video input signal;
    means for producing a temporal prediction of said video image from said reduced resolution digital signal;
    means for producing a spatial prediction of said first video image based upon said temporal prediction produced from said reduced resolution digital signal; and
    means for coding a second digital signal related to the picture elements of said video image, adaptively employing an estimate based upon said temporal or said spatial predictions of said video image.

2. The apparatus of claim 1 wherein said means for coding said second digital signal determines on a block basis if an estimate based upon said temporal prediction of said video image, or an estimate based upon said spatial prediction of said video image will be employed in the encoding of said second digital signal.

3. The apparatus of claim 1 wherein said frequency scaling of said received digital video input signal is performed on an 8×8 block basis.

4. The apparatus of claim 1 wherein said frequency scaling of said received digital video input signal is performed on an 4×4 block basis.

5. Method for encoding digital video signals, comprising the steps of:
    receiving a digital video input signal including a succession of digital representations related to picture elements of a video image;
    coding a reduced resolution digital signal related to the picture elements of said video image by frequency scaling said received digital video input signal;
    producing a temporal prediction of said video image from said reduced resolution digital signal;
    producing a spatial prediction of said video image based upon said temporal prediction produced from said reduced resolution digital signal; and
    coding a second digital signal related to the picture elements of said video image, adaptively employing an estimate based upon said temporal or said spatial predictions of said video image.

6. The method of claim 5 wherein a determination as to employing an estimate based upon said temporal prediction of said video image, or an estimate based upon said spatial prediction of said video image is made on a block basis during the coding of said second digital signal.

7. The method of claim 5 wherein said frequency scaling of said received digital video input signal is performed on an 8×8 block basis.

8. The method of claim 5 wherein said frequency scaling of said received digital video input signal is performed on an 4×4 block basis.

9. Apparatus for encoding digital video signals, comprising:
    means for receiving a digital video input signal including a succession of digital representations related to picture elements of at least two frames of a video image, each of said frames comprising a plurality of interlaced fields;
    means for coding a reduced resolution digital signal related to a field of a received frame by frequency scaling said received digital video input signal;
    means for coding an intermediate resolution digital signal related to said field of said received frame by frequency scaling said received digital video input signal;
    means for producing a temporal prediction of said field of said received frame from said intermediate resolution digital signal;
    means for producing a spatial prediction of said field of said received frame based upon said temporal prediction produced from said intermediate resolution digital signal; and
    means for coding a full resolution digital signal related to the picture elements of said field of said received frame, adaptively employing an estimate based upon said temporal or said spatial predictions of said field of said received frame.

10. The apparatus of claim 9 wherein said means for coding said full resolution digital signal determines on a block basis if an estimate based upon said temporal prediction of said field of first video field, or an estimate based upon said spatial prediction of said field of said first video field will be employed in the encoding of said full resolution digital signal.

11. The apparatus of claim 9 wherein said frequency scaling of said received digital video input signal is performed on an 4×4 block basis to code said reduced resolution digital signal, and wherein said frequency scaling of said received digital video input signal is performed on an 8×8 block basis to code said intermediate resolution digital signal.

12. Method for encoding digital video signals, comprising the steps of:
    receiving a digital video input signal including a succession of digital representations related to picture elements of at least two frames of a video image, each of said frames comprising a plurality of interlaced fields;
    coding a reduced resolution digital signal related to a field of a received frame by frequency scaling said received digital video input signal;
    coding an intermediate resolution digital signal related to said field of said received frame by frequency scaling said received digital video input signal;

producing a temporal prediction of said field of said received frame from said intermediate resolution digital signal;

producing a spatial prediction of said field of said received frame based upon said temporal prediction produced from said intermediate reduced resolution digital signal; and coding a full resolution digital signal related to the picture elements of said field of said received frame, adaptively employing an estimate based upon said temporal or said spatial predictions of said field of said received frame.

13. The method of claim 12 wherein a determination as to employing an estimate based upon said temporal prediction of said field of first video field, or an estimate based upon said spatial prediction of said field of said first video field is made on a block basis during the coding of said full resolution digital signal.

14. The method of claim 12 wherein said frequency scaling of said received digital video input signal is performed on an 4×4 block basis to code said reduced resolution digital signal, and wherein said frequency scaling of said received digital video input signal is performed on an 8×8 block basis to code said intermediate resolution digital signal.

15. Apparatus for encoding digital video signals, comprising:

means for receiving a digital video input signal including a succession of digital representations related to picture elements of at least two frames of a video image, each of said frames comprising a plurality of interlaced odd and even fields;

means for coding a reduced resolution digital signal related to an odd field of a received frame by frequency scaling said received digital video input signal;

means for coding an intermediate resolution digital signal related to said odd field of said received frame by frequency scaling said received digital video input signal;

means for producing a temporal prediction of said odd field of said received frame from said intermediate resolution digital signal;

means for producing a spatial prediction of said odd field of said received frame based upon said temporal prediction produced from said intermediate resolution digital signal; and means for coding a full resolution digital signal related to the picture elements of said odd field of said received frame, adaptively employing an estimate based upon said temporal or said spatial predictions of said odd field of said received frame.

16. The apparatus of claim 15 wherein said means for coding said full resolution digital signal determines on a block basis if an estimate based upon said temporal prediction of said odd field of first video field, or an estimate based upon said spatial prediction of said odd field of said first video field will be employed in the encoding of said full resolution digital signal.

17. The apparatus of claim 15 wherein said frequency scaling of said received digital video input signal is performed on a 4×4 block basis to code said reduced resolution digital signal, and wherein said frequency scaling of said received digital video input signal is performed on an 8×8 block basis to code said intermediate resolution digital signal.

18. Method for encoding digital video signals, comprising the steps of:

receiving a digital video input signal including a succession of digital representations related to picture elements of at least two frames of a video image, each of said frames comprising a plurality of interlaced odd and even fields;

coding a reduced resolution digital signal related to an odd field of a received frame by frequency scaling said received digital video input signal;

coding an intermediate resolution digital signal related to said odd field of said received frame by frequency scaling said received digital video input signal;

producing a temporal prediction of said odd field of said received frame from said intermediate resolution digital signal;

producing a spatial prediction of said odd field of said received frame based upon said temporal prediction produced from said second reduced resolution digital signal; and coding a full resolution digital signal related to the picture elements of said odd field of said received frame, adaptively employing an estimate based upon said temporal or said spatial predictions of said odd field of said received frame.

19. The method of claim 18 wherein a determination as to employing an estimate based upon said temporal prediction of said odd field of first video field, or an estimate based upon said spatial prediction of said odd field of said first video field is made on a block basis during the coding of said full resolution digital signal.

20. The method of claim 18 wherein said frequency scaling of said received digital video input signal is performed on an 4×4 block basis to code said reduced resolution digital signal, and wherein said frequency scaling of said received digital video input signal is performed on an 8×8 block basis to code said intermediate resolution digital signal.

21. Apparatus for encoding digital video signals, comprising:

means for receiving a digital video input signal including a succession of digital representation related to picture elements of at least two frames of a video image, each of said frames comprising a plurality of interlaced odd and even fields;

means for coding a reduced resolution digital signal related to an odd field of a received frame by frequency scaling said received digital video input signal;

means for coding an intermediate resolution digital signal related to said odd field of said received frame by frequency scaling said received digital video input signal;

means for producing a temporal prediction of said odd field of said received frame from said intermediate resolution digital signal;

means for producing a spatial prediction of said odd field of said received frame based upon said temporal prediction produced from said intermediate resolution digital signal;

means for coding a full resolution digital signal related to the picture elements of said odd field of said received frame, adaptively employing an estimate based upon said temporal or said spatial predictions of said odd field of said received frame;

means for coding a reduced resolution digital signal related to the picture elements of an even field of said received frame, employing, if said received frame is not the initial frame received, a prediction of said even field of said received frame based upon a previously coded even field from a previously received frame;

means for producing a temporal prediction of said even field of said received frame from said reduced resolution digital signal related to said even field of said received frame; and means for coding a full-resolution digital signal related to the picture elements of said even field of said received frame, adaptively employing an estimate based upon said temporal predictions of said even field of said received frame.

22. The apparatus of claim 21 wherein said means for coding said full resolution digital signal related to the picture elements of said odd field of said received frame determines on a block basis if an estimate based upon said temporal prediction of said odd field of first video field, or an estimate based upon said spatial prediction of said odd field of said first video field will be employed in the encoding of full resolution digital signal related to the picture elements of said odd field of said received frame.

23. The apparatus of claim 21 wherein said frequency scaling of said received digital video input signal is performed on an 4×4 block basis to code said reduced resolution digital signal related to said odd field of said received frame, and wherein said frequency scaling of said received digital video input signal is performed on an 8×8 block basis to code said intermediate resolution digital signal.

24. Method for encoding digital video signals, comprising the steps of:

receiving a digital video input signal including a succession of digital representations related to picture elements of at least two frames of a video image, each of said frames comprising a plurality of interlaced odd and even fields;

coding a reduced resolution digital signal related to an odd field of a received frame by frequency scaling said received digital video input signal;

coding an intermediate resolution digital signal related to said odd field of said received frame by frequency scaling said received digital video input signal;

producing a temporal prediction of said odd field of said received frame from said intermediate resolution digital signal;

producing a spatial prediction of said odd field of said received frame based upon said temporal prediction produced from said intermediate resolution digital signal;

coding a full resolution digital signal related to the picture elements of said odd field of said received frame, adaptively employing an estimate based upon said temporal or said spatial predictions of said odd field of said received frame;

coding a reduced resolution digital signal related to the picture elements of an even field of said received frame, employing, if said received frame is not the initial frame received, a prediction of said even field of said received frame based upon a previously coded even field from a previously received frame;

producing a temporal prediction of said even field of said received frame from said reduced resolution digital signal related to said even field of said received frame; and coding a full-resolution digital signal related to the picture elements of said even field of said received frame, adaptively employing an estimate based upon said temporal predictions of said even field of said received frame.

25. The method of claim 24 wherein a determination as to employing an estimate based upon said temporal prediction of said odd field of first video field, or an estimate based upon said spatial prediction of said odd field of said first video field is made on a block basis during the coding of said full resolution digital signal related to the picture elements of said odd field of said received frame.

26. The method of claim 24 wherein said frequency scaling of said received digital video input signal is performed on an 4×4 block basis to code said reduced resolution digital signal related to said odd field of said received frame, and wherein said frequency scaling of said received digital video input signal is performed on an 8×8 block basis to code said intermediate resolution digital signal.

27. Apparatus for decoding digital video signals, comprising:

means for receiving a first and second digital signals, said first digital signal related to a reduced resolution representation of a video image, and said second digital signal related to a full resolution representation of said video image;

means for decoding from said first digital signal said reduced resolution video image, employing in said decoding, if said decoded reduced resolution image is not the initial image to be decoded by said apparatus, a prediction of said reduced resolution video image based upon a previously decoded reduced resolution image from a previous video image;

means for producing a temporal prediction of said video image from said decoded reduced resolution field;

means for producing a spatial prediction of said video image based upon said reduced resolution video field; and means for decoding from said second digital signal said full resolution video image, employing an estimate based upon said temporal or said spatial predictions of said video image.

28. The apparatus of claim 27 wherein said means for decoding said second digital signal determines on a block basis if an estimate based upon said temporal prediction of said video image, or an estimate based upon said spatial prediction of said video image will be employed in the decoding of said second digital signal.

29. The apparatus of claim 27 wherein said first digital signal is frequency scaled on an 8×8 block basis.

30. The apparatus of claim 27 wherein said first digital signal is frequency scaled on an 4×4 block basis.

31. Method for decoding digital video signals, comprising the steps of:

receiving a first and second digital signals, said first digital signal related to a reduced resolution representation of a video image, and said second digital signal related to a full resolution representation of said video image;

decoding from said first digital signal said reduced resolution video image, employing in said decoding, if said decoded reduced resolution image is not the initial image to be decoded by said apparatus, a prediction of said reduced resolution video image based upon a previously decoded reduced resolution image from a previous video image;

producing a temporal prediction of said video image from said decoded reduced resolution field;

producing a spatial prediction of said video image based upon said reduced resolution video field; and decoding from said second digital signal said full resolution video image, employing an estimate based upon said temporal or said spatial predictions of said video image.

32. The method of claim 31 wherein a determination as to employing an estimate based upon said temporal prediction of said video image, or an estimate based upon said spatial prediction of said video image is made on a block basis during the decoding of said second digital signal.

33. The method of claim 31 wherein said first digital signal is frequency scaled on an 8×8 block basis.

34. The method of claim 31 wherein said first digital signal is frequency scaled on an 4×4 block basis.

35. Apparatus for decoding digital video signals, comprising:
  means for receiving a first, second and third digital signals, said first digital signal representing a reduced resolution field of a first frame of video, said second digital signal representing an intermediate resolution field of a first frame of video, and said third digital signal representing a full resolution field of said first frame of video;
  means for decoding from said first digital signal said reduced resolution video field, employing in said decoding, if said decoded reduced resolution field is not the initial field to be decoded by said apparatus, a prediction of said reduced resolution field based upon a previously decoded reduced resolution field from a previous frame;
  means for decoding from said second digital signal said intermediate resolution video field, employing in said decoding, if said decoded intermediate resolution field is not the initial field to be decoded by said apparatus, a prediction of said intermediate resolution field based upon a previously decoded field from a previous frame;
  means for producing a temporal prediction of said first field from said decoded intermediate resolution field;
  means for producing a spatial prediction of said received first video field based upon said decoded intermediate resolution video field; and
  means for decoding from said third digital signal said full resolution video field, employing an estimate based upon said temporal or said spatial predictions of said first video field.

36. The apparatus of claim 35 wherein said means for decoding said third digital signal determines on a block basis if an estimate based upon said temporal prediction of said first video field, or an estimate based upon said spatial prediction of said first video field will be employed in the decoding of said third digital signal.

37. The apparatus of claim 35 wherein said first digital signal is frequency scaled on an 4×4 block basis, and wherein said second digital video input signal is frequency scaled on an 8×8 block basis.

38. Method for decoding digital video signals, comprising the steps of:
  receiving a first, second and third digital signals, said first digital signal representing a reduced resolution field of a first frame of video, said second digital signal representing an intermediate resolution field of a first frame of video, and said third digital signal representing a full resolution field of said frame of video;
  decoding from said first digital signal said reduced resolution video field, employing in said decoding, if said decoded reduced resolution field is not the initial field to be decoded by said apparatus, a prediction of said reduced resolution field based upon a previously decoded reduced resolution field from a previous frame;
  decoding from said second digital signal said intermediate resolution video field, employing in said decoding, if said decoded intermediate resolution field is not the initial field to be decoded by said apparatus, a prediction of said intermediate resolution field based upon a previously decoded field from a previous frame;
  producing a temporal prediction of said first field from said decoded intermediate resolution field;
  producing a spatial prediction of said received first video field based upon said decoded intermediate resolution video field; and
  decoding from said third digital signal said full resolution video field, employing an estimate based upon said temporal or said spatial predictions of said first video field.

39. The method of claim 38 wherein a determination as to employing an estimate based upon said temporal prediction of said first video field, or an estimate based upon said spatial prediction of said first video field is made on a block basis during the decoding of said third digital signal.

40. The method of claim 38 wherein said first digital signal is frequency scaled on an 4×4 block basis, and wherein said second digital video input signal is frequency scaled on an 8×8 block basis.

41. Apparatus for decoding digital video signals, comprising:
  means for receiving a first, second and third digital signals, said first digital signal representing a reduced resolution field of an odd field of a first frame of video, said second digital signal representing an intermediate resolution field of said odd field of said first frame of video, and said third digital signal representing a full resolution odd field of said first frame of video;
  means for decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;
  means for decoding from said second digital signal said intermediate resolution odd field, employing in said decoding, if said decoded intermediate resolution odd field is not the initial odd field to be decoded by said apparatus, a prediction of said intermediate resolution odd field based upon a previously decoded odd field from a previous frame;
  means for producing a temporal prediction of said odd field of said first frame from said decoded intermediate resolution odd field;
  means for producing a spatial prediction of said odd field of said first frame based upon said decoded intermediate resolution odd field; and means for decoding from said third digital signal said full resolution odd field, employing an estimate based upon said temporal or said spatial predictions of said odd field of said first frame.

42. The apparatus of claim 41 wherein said means for decoding said third digital signal determines on a block basis if an estimate based upon said temporal prediction of said odd field of said first frame, or an estimate based upon said spatial prediction of said odd field of said first frame will be employed in the decoding of said third digital signal.

43. The apparatus of claim 41 wherein said first digital signal is frequency scaled on an 4×4 block basis, and wherein said second digital video input signal is frequency scaled on an 8×8 block basis.

44. Method for decoding digital video signals, comprising the steps of:
receiving a first, second and third digital signals, said first digital signal representing a reduced resolution field of an odd field of a first frame of video, said second digital signal representing an intermediate resolution field of said odd field of said first frame of video, and said third digital signal representing a full resolution odd field of said first frame of video;
decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;
decoding from said second digital signal said intermediate resolution odd field, employing in said decoding, if said decoded intermediate resolution odd field is not the initial odd field to be decoded by said apparatus, a prediction of said intermediate resolution odd field based upon a previously decoded odd field from a previous frame;
producing a temporal prediction of said odd field of said first frame from said decoded intermediate resolution odd field;
producing a spatial prediction of said odd field of said first frame based upon said decoded intermediate resolution odd field; and
decoding from said third digital signal said full resolution odd field, employing an estimate based upon said temporal or said spatial predictions of said odd field of said first frame.

45. The method of claim 44 wherein a determination as to employing an estimate based upon said temporal prediction of said odd field of said first frame, or an estimate based upon said spatial prediction of said odd field of said first frame is made on a block basis during the decoding of said third digital signal.

46. The method of claim 44 wherein said first digital signal is frequency scaled on an 4×4 block basis, and wherein said second digital video input signal is frequency scaled on an 8×8 block basis.

47. Apparatus for decoding digital video signals, comprising:
means for receiving a first, second, third, fourth and fifth digital signals, said first digital signal representing a reduced resolution field of an odd field of a first frame of video, said second digital signal representing an intermediate resolution field of said odd field of said first frame of video, said third digital signal representing a full resolution odd field of said first frame of video, said fourth digital signal representing a reduced resolution field of an even field of a first frame of video, and said fifth digital signal representing a full resolution even field of said first frame of video;
means for decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;
means for decoding from said second digital signal said intermediate resolution odd field, employing in said decoding, if said decoded intermediate resolution odd field is not the initial odd field to be decoded by said apparatus, a prediction of said intermediate resolution odd field based upon a previously decoded odd field from a previous frame;
means for producing a temporal prediction of said odd field of said first frame from said decoded intermediate resolution odd field;
means for producing a spatial prediction of said odd field of said first frame based upon said decoded intermediate resolution odd field;
means for decoding from said third digital signal said full resolution odd field, employing an estimate based upon said temporal or said spatial predictions of said odd field of said first frame;
means for decoding from said fourth digital signal said reduced resolution even field, employing in said decoding, if said decoded reduced resolution even field is not the initial even field to be decoded by said apparatus, a prediction of said reduced resolution even field based upon a previously decoded even field from a previous frame;
means for producing a temporal prediction of said even field of said first frame from said decoded reduced resolution even field; and
means for decoding from said fifth digital signal said full resolution even field, employing an estimate based upon said temporal prediction of said even field of said first frame.

48. The apparatus of claim 47 wherein said means for decoding said third digital signal determines on a block basis if an estimate based upon said temporal prediction of said odd field of said first frame, or an estimate based upon said spatial prediction of said odd field of said first frame will be employed in the decoding of said third digital signal.

49. The apparatus of claim 47 wherein said first digital signal is frequency scaled on an 4×4 block basis, and wherein said second digital video input signal is frequency scaled on an 8×8 block basis.

50. Method for decoding digital video signals, comprising the steps of:
receiving a first, second, third, fourth and fifth digital signals, said first digital signal representing a reduced resolution field of an odd field of a first frame of video, said second digital signal representing an intermediate resolution field of said odd field of said first frame of video, said third digital signal representing a full resolution odd field of said first frame of video, said fourth digital signal representing a reduced resolution field of an even field of a first frame of video, and said fifth digital signal representing a full resolution even field of said first frame of video;

decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;

decoding from said second digital signal said intermediate resolution odd field, employing in said decoding, if said decoded intermediate resolution odd field is not the initial odd field to be decoded by said apparatus, a prediction of said intermediate resolution odd field based upon a previously decoded odd field from a previous frame;

producing a temporal prediction of said odd field of said first frame from said decoded intermediate resolution odd field;

producing a spatial prediction of said odd field of said first frame based upon said decoded intermediate resolution odd field;

decoding from said third digital signal said full resolution odd field, employing an estimate based upon said temporal or said spatial predictions of said odd field of said first frame;

decoding from said fourth digital signal said reduced resolution even field, employing in said decoding, if said decoded reduced resolution even field is not the initial even field to be decoded by said apparatus, a prediction of said reduced resolution even field based upon a previously decoded even field from a previous frame;

producing a temporal prediction of said even field of said first frame from said decoded reduced resolution even field; and decoding from said fifth digital signal said full resolution even field, employing an estimate based upon said temporal prediction of said even field of said first frame.

51. The method of claim 50 wherein a determination as to employing an estimate based upon said temporal prediction of said odd field of said first frame, or an estimate based upon said spatial prediction of said odd field of said first frame is made on a block basis during the decoding of said third digital signal.

52. The method of claim 50 wherein said first digital signal is frequency scaled on an $4 \times 4$ block basis, and wherein said second digital video input signal is frequency scaled on an $8 \times 8$ block basis.

* * * * *